United States Patent
Rubinstein et al.

(10) Patent No.: US 9,262,482 B2
(45) Date of Patent: *Feb. 16, 2016

(54) GENERATING DEFAULT SEARCH QUERIES ON ONLINE SOCIAL NETWORKS

(71) Applicant: Facebook, Inc., Menlo Park, CA (US)

(72) Inventors: Yigal Dan Rubinstein, Los Altos, CA (US); Sue Yee Young, San Francisco, CA (US); Joshua Keith Duck, San Carlos, CA (US); Sadi Khan, Mountain View, CA (US); William R. Maschmeyer, San Francisco, CA (US); Yuval Kesten, San Francisco, CA (US); Keith L. Peiris, San Francisco, CA (US); Kathryn Hymes, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 166 days.

This patent is subject to a terminal disclaimer.

(21) Appl. No.: 14/052,536

(22) Filed: Oct. 11, 2013

(65) Prior Publication Data

US 2014/0040285 A1 Feb. 6, 2014

Related U.S. Application Data

(63) Continuation-in-part of application No. 13/732,175, filed on Dec. 31, 2012, now Pat. No. 8,918,418, which is a continuation-in-part of application No. 13/556,046, filed on Jul. 23, 2012, now Pat. No. 8,751,521, which is a continuation-in-part of application No. 12/763,162, filed on Apr. 19, 2010, now Pat. No. 8,572,129.

(51) Int. Cl.
*G06F 17/30* (2006.01)
*G06Q 30/02* (2012.01)
*G06Q 50/00* (2012.01)

(52) U.S. Cl.
CPC ...... *G06F 17/3053* (2013.01); *G06F 17/30392* (2013.01); *G06F 17/30528* (2013.01); *G06F 17/30554* (2013.01); *G06Q 50/01* (2013.01); *G06Q 30/02* (2013.01)

(58) Field of Classification Search
CPC .................. G06F 17/30861; G06F 17/30392; G06F 17/30528; G06F 17/30554; G06Q 50/01; G06Q 30/02
USPC ......... 707/722, 727, 728, 732, 751, 767, 769, 707/784, 798, 802
See application file for complete search history.

(56) References Cited

U.S. PATENT DOCUMENTS 6,539,232 B2  3/2003  Hendrey
6,957,184 B2  10/2005  Schmid (Continued)

OTHER PUBLICATIONS

U.S. Appl. No. 14/052,548, filed Oct. 11, 2013, Yigal Dan Rubinstein.

(Continued)

*Primary Examiner* — Jorge A Casanova
(74) *Attorney, Agent, or Firm* — Baker Botts L.L.P.

(57) ABSTRACT

In one embodiment, a method includes accessing a social graph that includes a plurality of nodes and edges, generating a plurality of structured queries, where each structured query comprises references to nodes and edges of the social graph, calculating a score for each structured query based on user-engagement factors, and sending each structured query having a score greater than a threshold score to a first user for display.

20 Claims, 22 Drawing Sheets

(56) References Cited

U.S. PATENT DOCUMENTS

| | | | |
|---|---|---|---|
| 7,539,697 B1 | 5/2009 | Akella |
| 7,752,326 B2 | 7/2010 | Smit |
| 7,836,044 B2 | 11/2010 | Kamvar |
| 8,027,990 B1 | 9/2011 | Mysen |
| 8,060,639 B2 | 11/2011 | Smit |
| 8,112,529 B2 | 2/2012 | Smit |
| 8,180,804 B1 | 5/2012 | Narayanan |
| 8,185,558 B1 | 5/2012 | Narayanan |
| 8,239,364 B2 | 8/2012 | Wable |
| 8,244,848 B1 | 8/2012 | Narayanan |
| 8,271,471 B1 | 9/2012 | Kamvar |
| 8,271,546 B2 | 9/2012 | Gibbs |
| 8,321,364 B1 | 11/2012 | Gharpure |
| 8,364,709 B1 | 1/2013 | Das |
| 8,386,465 B2 | 2/2013 | Ansari |
| 8,407,200 B2 | 3/2013 | Wable |
| 8,412,749 B2 | 4/2013 | Fortuna |
| 8,538,960 B2 | 9/2013 | Wong |
| 8,572,129 B1 | 10/2013 | Lee |
| 8,595,297 B2 | 11/2013 | Marcucci |
| 8,601,027 B2 | 12/2013 | Behforooz |
| 2002/0196273 A1 | 12/2002 | Krause |
| 2003/0154194 A1 | 8/2003 | Jonas |
| 2003/0208474 A1 | 11/2003 | Soulanille |
| 2004/0088325 A1 | 5/2004 | Elder |
| 2004/0255237 A1 | 12/2004 | Tong |
| 2005/0131872 A1 | 6/2005 | Calbucci |
| 2005/0171955 A1 | 8/2005 | Hull |
| 2006/0136419 A1 | 6/2006 | Brydon |
| 2007/0277100 A1 | 11/2007 | Sheha |
| 2008/0270615 A1 | 10/2008 | Centola |
| 2009/0006543 A1 | 1/2009 | Smit |
| 2009/0164408 A1* | 6/2009 | Grigorik et al. ............... 707/1 |
| 2009/0164929 A1 | 6/2009 | Chen |
| 2009/0197681 A1 | 8/2009 | Krishnamoorthy |
| 2009/0228296 A1 | 9/2009 | Ismalon |
| 2009/0281988 A1 | 11/2009 | Yoo |
| 2009/0299963 A1 | 12/2009 | Pippori |
| 2010/0235354 A1 | 9/2010 | Gargaro |
| 2011/0078166 A1 | 3/2011 | Oliver |
| 2011/0087534 A1 | 4/2011 | Strebinger |
| 2011/0196855 A1 | 8/2011 | Wable |
| 2012/0136852 A1 | 5/2012 | Geller |
| 2012/0166432 A1 | 6/2012 | Tseng |
| 2012/0179637 A1 | 7/2012 | Juan |
| 2012/0185486 A1 | 7/2012 | Voigt |
| 2012/0221581 A1 | 8/2012 | Narayanan |
| 2012/0271831 A1 | 10/2012 | Narayanan |
| 2012/0278127 A1 | 11/2012 | Kirakosyan |
| 2012/0284329 A1 | 11/2012 | van den Oord |
| 2012/0311034 A1 | 12/2012 | Goldband |
| 2013/0031106 A1 | 1/2013 | Schechter |
| 2013/0041876 A1 | 2/2013 | Dow |
| 2013/0066876 A1 | 3/2013 | Raskino |
| 2013/0086057 A1 | 4/2013 | Harrington |
| 2013/0124538 A1 | 5/2013 | Lee |
| 2013/0124542 A1 | 5/2013 | Lee |
| 2013/0144899 A1 | 6/2013 | Lee |
| 2013/0191372 A1 | 7/2013 | Lee |
| 2013/0191416 A1 | 7/2013 | Lee |

OTHER PUBLICATIONS

U.S. Appl. No. 14/052,564, filed Oct. 11, 2013, Yigal Dan Rubinstein.
U.S. Appl. No. 14/052,585, filed Oct. 11, 2013, Yigal Dan Rubinstein.
U.S. Appl. No. 14/052,596, filed Oct. 11, 2013, Yigal Dan Rubinstein.
Zhdanova, Av, et al., "A Social Networking Model of a Web Community", In: Proceedings of 10th international symposium on social communication, pp. 1-5, 2007.
Xin Xin, I.K., et al., "A Social Recommendation Framework Based on Multi-scale Continuous Conditional Random Fields," CIKM'09; pp. 1247-1256, Nov. 2-6, 2009.
IEEE Xplore Search Results for: "social network document node recommend" Listed by examiner in U.S. Appl. No. 12/763,145, Dec. 8, 2012.
ACM Digital Library: Search Results for: "social network document node recommend" Listed by examiner in U.S. Appl. No. 12/763,145, Dec. 8, 2012.
Sankar, et al., "Under the Hood: Building out the infrastructure for Graph Search's infrastructure"; Available online at FTP: https://www.facebook.com/note.php?note_id=10151347573598920; pp. 1-8. [downloaded Nov. 5, 2013], Mar. 6, 2013.
Sankar, et al., "Under the Hood: Indexing and ranking in Graph Search," https://www.facebook.com/notes/facebook-engineering/under-the-hood-indexing-and-ranking-in-graph-search/10151361720763920; pp. 1-9. [downloaded Nov. 5, 2013], Mar. 14, 2013.
Li, et al., "Under the Hood: The natural language interface of Graph Search," Available online at FTP: https://www.facebook.com/notes/facebook-engineering/under-the-hood-the-natural-language-interface-of-graph-search/10151432733048920; pp. 1-8. [downloaded Nov. 5, 2013], Apr. 29, 2013.
U.S. Appl. No. 14/804,218, filed Jul. 20, 2015, Yigal Dan Rubinstein.
U.S. Appl. No. 14/804,234, filed Jul. 20, 2015, Yigal Dan Rubinstein.

\* cited by examiner

FIG. 12B

GENERATING DEFAULT SEARCH QUERIES ON ONLINE SOCIAL NETWORKS

PRIORITY

This application is a continuation-in-part under 35 U.S.C. §120 of U.S. patent application Ser. No. 13/732,175, filed 31 Dec. 2012, which is a continuation-in-part under 35 U.S.C. §120 of U.S. patent application Ser. No. 13/556,046, filed 23 Jul. 2012, which is a continuation-in-part under 35 U.S.C. §120 of U.S. patent application Ser. No. 12/763,162, filed 19 Apr. 2010, issued as U.S. Pat. No. 8,572,129 on 29 Oct. 2013, each of which is incorporated by reference.

TECHNICAL FIELD

This disclosure generally relates to social graphs and performing searches for objects within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, a social-networking system may generate structured queries that include references to particular social-graph elements. These structured queries may be generated, for example, in response to a text query provided by a user, or generated as default queries. By providing suggested structured queries to a user's text query, the social-networking system may provide a powerful way for users of an online social network to search for elements represented in a social graph based on their social-graph attributes and their relation to various social-graph elements.

In particular embodiments, the social-networking system may generate a set of default structured queries for a page of the online social network. The social-networking system may identify a page that a user is currently viewing or otherwise accessing and then identifying any social-graph elements corresponding to that page. The social-graph elements corresponding to a page may be, for example, the node corresponding to a user- or concept-profile page, or the nodes/edges referenced in a structured query used to generate a particular search-results page. The social-networking system may then generate a set of default structured queries for the page based on the identified social-graph elements for that page. For example, when accessing a user-profile page for the user "Mark", some of the default structured queries for that page may include "Friends of Mark" or "Photos of Mark". These default structured queries may then be sent and displayed to the user.

In particular embodiments, the social-networking system may generate suggested structured queries for a user based on user-engagement factors. It may be desirable for the social-networking system to provide users with structured queries that are more interesting to the user and thus more likely to be engaged with (e.g., selected or clicked-thru). A variety of factors may be used to increase user engagement, such as, for example, business-intelligence, user-preference/history, social-graph affinity, advertising sponsorship, or other suitable factors may be used to determine which suggested queries to serve to the user. The social-networking system may calculate which structured queries are more likely to be engaged with by a user, and then send suggested queries to the user that the user is more likely to engage with.

In particular embodiments, the social-networking system may generate sponsored queries for a user. An advertiser may identify a company, brand, product, event, person, or other thing that the advertiser is associated with or wants to sponsor. The social-networking system may then identify social-graph elements corresponding to the thing the advertiser wants to sponsor and generate one or more structured queries referencing the identified social-graph elements. For example, an advertiser associated with the application "Online Poker" may want to sponsor queries referencing the application. In response to receiving an indication the advertiser wants to sponsor queries referencing "Online Poker", the social-networking system may identify a node in a social graph corresponding to the "Online Poker" application. One or more sponsored queries referencing the identified social-graph element may then be generated. For example, the social-networking system may generate a sponsored query "My friends who play Online Poker", where the reference to "Online Poker" is a reference to the social-graph entity corresponding to the application "Online Poker." These sponsored queries may then be sent to the querying user and displayed on a page accessed by the user.

In particular embodiments, the social-networking system may generate dynamic queries for a user. A dynamic query is a type of structured query that references additions, changes, or other updates to objects associated with the online social network. Dynamic queries may relate to trending activity or trending queries by other users on the online social network, such as, for example, "Posts by my friends about [news story from yesterday]" or "Photos of my friend in [location where the querying user just visited]". Dynamic queries may also be related to recent/timely content. For example, the structured query "Recent photos of my friends (+2)" is a dynamic query referencing recently added content to the online social network, where the reference to "(+2)" indicates the number of new photos that the query will produce. Similarly, the dynamic queries may relate to changes to search results, either over time or since the query was last run. Dynamic queries may provide an elegant way for users of the online social network to see that particular updates have occurred or are occurring on the online social network.

In particular embodiments, the social-networking system may allow users to share structured queries and search results with other users of the online social network. Users of the online social network may want to share structured queries and their corresponding search results with other users of the online social network, allowing those users to view the query and/or search results. The social-networking system may receive a selection from a first user of a structured query that the first user wants to share with one or more second users of the online social network. Structured queries and search results may be shared with any suitable users of the online social network, such as, for example, users within a threshold degree of separation of the first user, particular groups or networks, or publically. The social-networking system may then send the selected structured query to one or more second users. For example, a first user may select a particular structured query, such as "My friends who work at Facebook". The social-networking system may then generate search results corresponding to that structured query. The search-results page may include an activatable link allowing the first user to share the structured query and/or search results directly from the search-results page, such as a "Share this search with your friends!" link. The first user may select this link, and in response the social-networking system may share the structured query and one or more of the search results by displaying them a page of a second user, such as the second user's newsfeed page. The second user may then select the shared query, which may then be executed by the social-networking system for the second user.

In particular embodiments, the social-networking system may generate structured queries that are displayed with previews of the search results corresponding to the queries. When a structured query is generated, the social-networking system may also generate search results corresponding to one or more of the structured queries. The search results may be generated concurrently with the structured queries, or in response to a selection (e.g., mousing over) of one of the structured queries by the querying user. The structured queries and search results could then be sent to the querying user for display, where one or more of the queries could be displayed with a preview of the search results corresponding to the query. The preview could be displayed in any suitable manner. For example, the querying user may mouse-over a structured query and a preview for that structured query may be generated and displayed just below the query, where the preview may show the names and thumbnail photos of some of the matching search results. Previews of search results may be displayed in association with any suitable type of search query. Furthermore, if a structured query is shared with other users, the shared structured query may be displayed with a preview of the search results. By generating previews to display with structured queries, the social-networking system may provide an a quick and convenient way for users of the online social network to review search results for a particular query.

The embodiments disclosed above are only examples, and the scope of this disclosure is not limited to them. Particular embodiments may include all, some, or none of the components, elements, features, functions, operations, or steps of the embodiments disclosed above.

BRIEF DESCRIPTION OF THE DRAWINGS

FIGS. 12A-12C illustrate example pages of an online social network.

DESCRIPTION OF EXAMPLE EMBODIMENTS

System Overview

Figure 1:
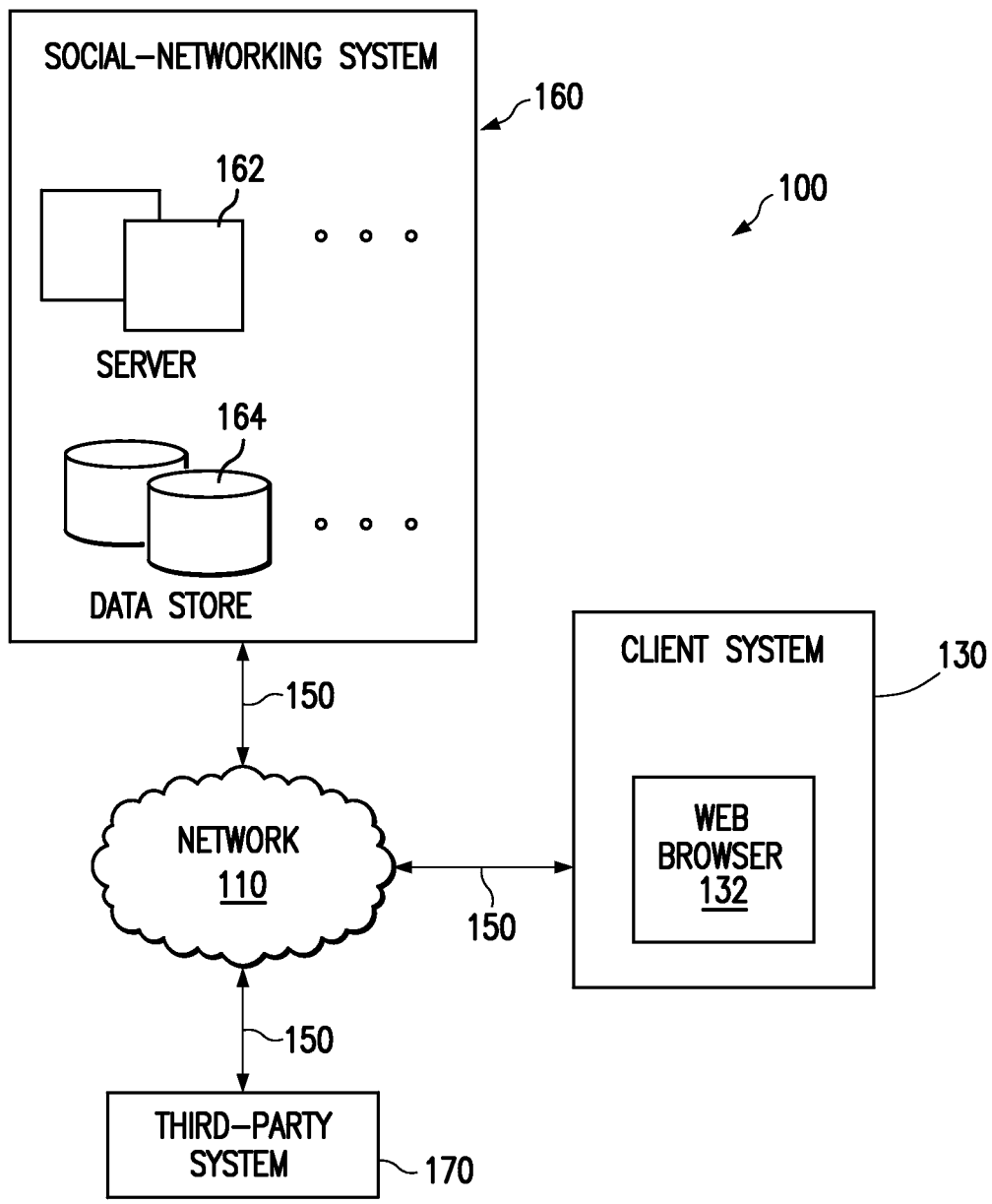
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable page files, including webpages or pages presented as a user interface of a native application. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 164 may include one or more data stores 164. Data stores 164 may be used to store various types of information. In particular embodiments, the information stored in data stores 164 may be organized according to specific data structures. In particular embodiments, each data store 164 may be a relational database. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (i.e., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, ad-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Ad-pricing modules may combine social information, the current time, location information, or other suitable information to provide relevant advertisements, in the form of notifications, to a user.

Social Graphs

Figure 2:
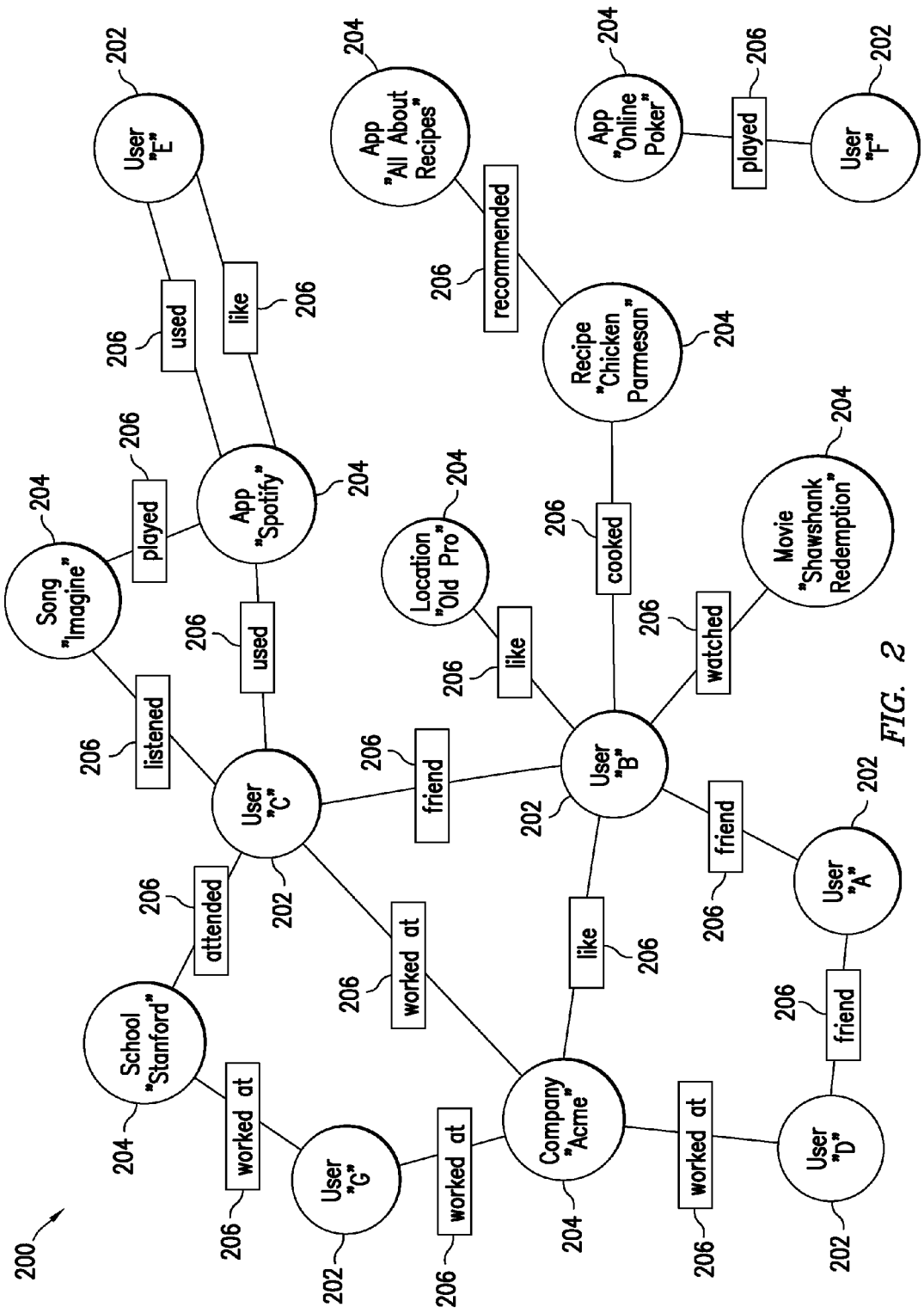
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more pages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-networking system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more pages.

In particular embodiments, a node in social graph 200 may represent or be represented by a page (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to send to social-networking system 160 a message indicating the user's action. In response to the message, social-networking system 160 may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 24. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Typeahead Processes

In particular embodiments, one or more client-side and/or backend (server-side) processes may implement and utilize a "typeahead" feature that may automatically attempt to match social-graph elements (e.g., user nodes 202, concept nodes 204, or edges 206) to information currently being entered by a user in an input form rendered in conjunction with a requested page (such as, for example, a user-profile page, a concept-profile page, a search-results page, a user interface of a native application associated with the online social network, or another suitable page of the online social network), which may be hosted by or accessible in the social-networking system 160. In particular embodiments, as a user is entering text to make a declaration, the typeahead feature may attempt to match the string of textual characters being entered in the declaration to strings of characters (e.g., names, descriptions) corresponding to user, concepts, or edges and their corresponding elements in the social graph 200. In particular embodiments, when a match is found, the typeahead feature may automatically populate the form with a reference to the social-graph element (such as, for example, the node name/type, node ID, edge name/type, edge ID, or another suitable reference or identifier) of the existing social-graph element.

In particular embodiments, as a user types or otherwise enters text into a form used to add content or make declarations in various sections of the user's profile page, home page, or other page, the typeahead process may work in conjunction with one or more frontend (client-side) and/or backend (server-side) typeahead processes (hereinafter referred to simply as "typeahead process") executing at (or within) the social-networking system 160 (e.g., within servers 162), to interactively and virtually instantaneously (as appearing to the user) attempt to auto-populate the form with a term or terms corresponding to names of existing social-graph elements, or terms associated with existing social-graph elements, determined to be the most relevant or best match to the characters of text entered by the user as the user enters the characters of text. Utilizing the social-graph information in a social-graph database or information extracted and indexed from the social-graph database, including information associated with nodes and edges, the typeahead processes, in conjunction with the information from the social-graph database, as well as potentially in conjunction with various others processes, applications, or databases located within or executing within social-networking system 160, may be able to predict a user's intended declaration with a high degree of precision. However, the social-networking system 160 can also provides user's with the freedom to enter essentially any declaration they wish, enabling users to express themselves freely.

In particular embodiments, as a user enters text characters into a form box or other field, the typeahead processes may attempt to identify existing social-graph elements (e.g., user nodes 202, concept nodes 204, or edges 206) that match the string of characters entered in the user's declaration as the user is entering the characters. In particular embodiments, as the user enters characters into a form box, the typeahead process may read the string of entered textual characters. As each keystroke is made, the frontend-typeahead process may send the entered character string as a request (or call) to the backend-typeahead process executing within social-networking system 160. In particular embodiments, the typeahead processes may communicate via AJAX (Asynchronous JavaScript and XML) or other suitable techniques, and particularly, asynchronous techniques. In particular embodiments, the request may be, or comprise, an XMLHTTPRequest (XHR) enabling quick and dynamic sending and fetching of results. In particular embodiments, the typeahead process may also send before, after, or with the request a section identifier (section ID) that identifies the particular section of the particular page in which the user is making the declaration. In particular embodiments, a user ID parameter may also be sent, but this may be unnecessary in some embodiments, as the user may be "known" based on the user having logged into (or otherwise been authenticated by) the social-networking system 160.

In particular embodiments, the typeahead process may use one or more matching algorithms to attempt to identify matching social-graph elements. In particular embodiments, when a match or matches are found, the typeahead process may send a response (which may utilize AJAX or other suitable techniques) to the user's client system 130 that may include, for example, the names (name strings) or descriptions of the matching social-graph elements as well as, potentially, other metadata associated with the matching social-graph elements. As an example and not by way of limitation, if a user entering the characters "pok" into a query field, the typeahead process may display a drop-down menu that displays names of matching existing profile pages and respective user nodes 202 or concept nodes 204, such as a profile page named or devoted to "poker" or "pokemon", which the user can then click on or otherwise select thereby confirming the desire to declare the matched user or concept name corresponding to the selected node. As another example and not by way of limitation, upon clicking "poker," the typeahead process may auto-populate, or causes the web browser 132 to auto-populate, the query field with the declaration "poker". In particular embodiments, the typeahead process may simply auto-populate the field with the name or other identifier of the top-ranked match rather than display a drop-down menu. The user may then confirm the auto-populated declaration simply by keying "enter" on his or her keyboard or by clicking on the auto-populated declaration.

More information on typeahead processes may be found in U.S. patent application Ser. No. 12/763,162, filed 19 Apr. 2010, and U.S. patent application Ser. No. 13/556,072, filed 23 Jul. 2012, which are incorporated by reference.

Structured Search Queries

Figure 3:
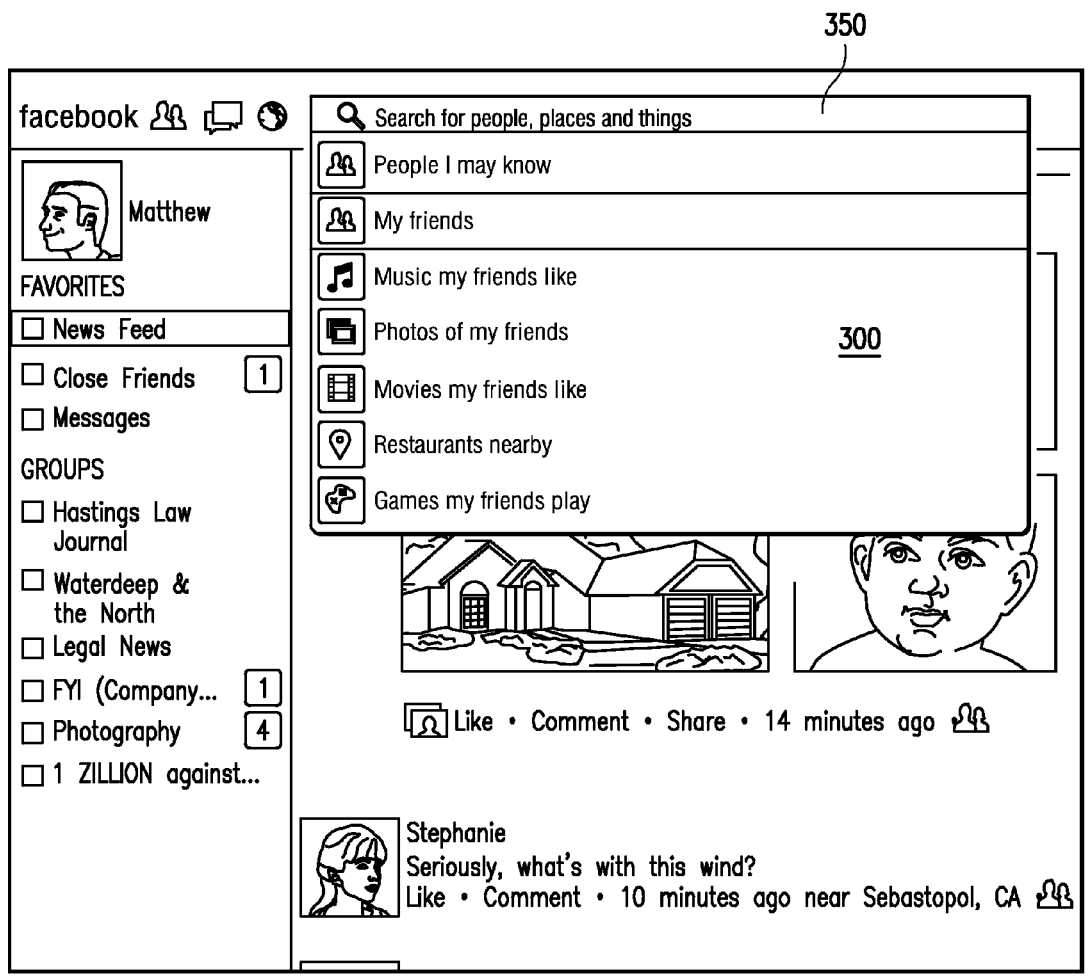
FIG. 3 illustrates an example page of an online social network.

FIG. 3 illustrates an example page of an online social network. In particular embodiments, a user may submit a query to the social-networking system 160 by inputting text into query field 350. A user of an online social network may search for information relating to a specific subject matter (e.g., users, concepts, external content or resource) by providing a short phrase describing the subject matter, often referred to as a "search query," to a search engine. The query may be an unstructured text query and may comprise one or more text strings (which may include one or more n-grams). In general, a user may input any character string into query field 350 to search for content on the social-networking system 160 that matches the text query. The social-networking system 160 may then search a data store 164 (or, in particular, a social-graph database) to identify content matching the query. The search engine may conduct a search based on the query phrase using various search algorithms and generate search results that identify resources or content (e.g., user-profile pages, content-profile pages, or external resources) that are most likely to be related to the search query. To conduct a search, a user may input or send a search query to the search engine. In response, the search engine may identify one or more resources that are likely to be related to the search query, each of which may individually be referred to as a "search result," or collectively be referred to as the "search results" corresponding to the search query. The identified content may include, for example, social-graph elements (i.e., user nodes 202, concept nodes 204, edges 206), profile pages, external webpages, or any combination thereof. The social-networking system 160 may then generate a search-results page with search results corresponding to the identified content and send the search-results page to the user. The search results may be presented to the user, often in the form of a list of links on the search-results page, each link being associated with a different page that contains some of the identified resources or content. In particular embodiments, each link in the search results may be in the form of a Uniform Resource Locator (URL) that specifies where the corresponding page is located and the mechanism for retrieving it. The social-networking system 160 may then send the search-results page to the web browser 132 on the user's client system 130. The user may then click on the URL links or otherwise select the content from the search-results page to access the content from the social-networking system 160 or from an external system (such as, for example, a third-party system 170), as appropriate. The resources may be ranked and presented to the user according to their relative degrees of relevance to the search query. The search results may also be ranked and presented to the user according to their relative degree of relevance to the user. In other words, the search results may be personalized for the querying user based on, for example, social-graph information, user information, search or browsing history of the user, or other suitable information related to the user. In particular embodiments, ranking of the resources may be determined by a ranking algorithm implemented by the search engine. As an example and not by way of limitation, resources that are more relevant to the search query or to the user may be ranked higher than the resources that are less relevant to the search query or the user. In particular embodiments, the search engine may limit its search to resources and content on the online social network. However, in particular embodiments, the search engine may also search for resources or contents on other sources, such as a third-party system 170, the internet or World Wide Web, or other suitable sources. Although this disclosure describes querying the social-networking system 160 in a particular manner, this disclosure contemplates querying the social-networking system 160 in any suitable manner.

In particular embodiments, the typeahead processes described herein may be applied to search queries entered by a user. As an example and not by way of limitation, as a user enters text characters into a query field 350, a typeahead process may attempt to identify one or more user nodes 202, concept nodes 204, or edges 206 that match the string of characters entered into query field 350 as the user is entering the characters. As the typeahead process receives requests or calls including a string or n-gram from the text query, the typeahead process may perform or causes to be performed a search to identify existing social-graph elements (i.e., user nodes 202, concept nodes 204, edges 206) having respective names, types, categories, or other identifiers matching the entered text. The typeahead process may use one or more matching algorithms to attempt to identify matching nodes or edges. When a match or matches are found, the typeahead process may send a response to the user's client system 130 that may include, for example, the names (name strings) of the matching nodes as well as, potentially, other metadata associated with the matching nodes. The typeahead process may then display a drop-down menu 300 that displays names of matching existing profile pages and respective user nodes 202 or concept nodes 204, and displays names of matching edges 206 that may connect to the matching user nodes 202 or concept nodes 204, which the user can then click on or otherwise select thereby confirming the desire to search for the matched user or concept name corresponding to the selected node, or to search for users or concepts connected to the matched users or concepts by the matching edges. Alternatively, the typeahead process may simply auto-populate the form with the name or other identifier of the top-ranked match rather than display a drop-down menu 300. The user may then confirm the auto-populated declaration simply by keying "enter" on a keyboard or by clicking on the auto-populated declaration. Upon user confirmation of the matching nodes and edges, the typeahead process may send a request that informs the social-networking system 160 of the user's confirmation of a query containing the matching social-graph elements. In response to the request sent, the social-networking system 160 may automatically (or alternately based on an instruction in the request) call or otherwise search a social-graph database for the matching social-graph elements, or for social-graph elements connected to the matching social-graph elements as appropriate. Although this disclosure describes applying the typeahead processes to search queries in a particular manner, this disclosure contemplates applying the typeahead processes to search queries in any suitable manner.

In connection with search queries and search results, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, and U.S. patent application Ser. No. 12/978,265, filed 23 Dec. 2010, which are incorporated by reference.

Element Detection and Parsing Ambiguous Terms

Figure 4A:
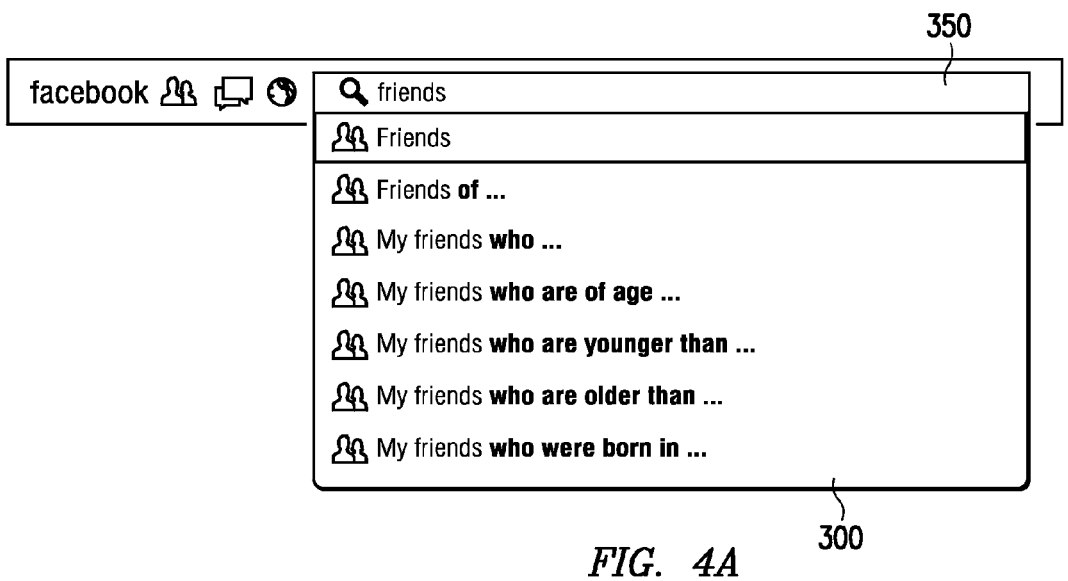
FIGS. 4A-4B illustrate example queries of the social network.
Figure 4B:
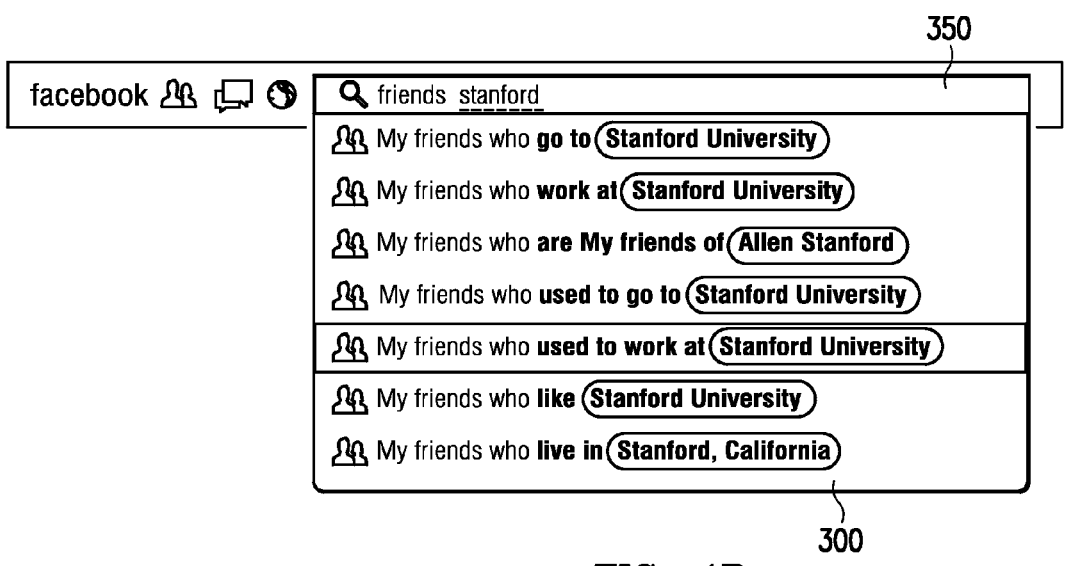

FIGS. 4A-4B illustrate example queries of the social network. In particular embodiments, in response to a text query received from a first user (i.e., the querying user), the social-networking system 160 may parse the text query and identify portions of the text query that correspond to particular social-graph elements. However, in some cases a query may include one or more terms that are ambiguous, where an ambiguous term is a term that may possibly correspond to multiple social-graph elements. To parse the ambiguous term, the social-networking system 160 may access a social graph 200 and then parse the text query to identify the social-graph elements that corresponded to ambiguous n-grams from the text query. The social-networking system 160 may then generate a set of structured queries, where each structured query corresponds to one of the possible matching social-graph elements. These structured queries may be based on strings generated by a grammar model, such that they are rendered in a natural-language syntax with references to the relevant social-graph elements. These structured queries may be presented to the querying user, who can then select among the structured queries to indicate which social-graph element the querying user intended to reference with the ambiguous term. In response to the querying user's selection, the social-networking system 160 may then lock the ambiguous term in the query to the social-graph element selected by the querying user, and then generate a new set of structured queries based on the selected social-graph element. FIGS. 4A-4B illustrate various example text queries in query field 350 and various structured queries generated in response in drop-down menus 300 (although other suitable graphical user interfaces are possible). By providing suggested structured queries in response to a user's text query, the social-networking system 160 may provide a powerful way for users of the online social network to search for elements represented in the social graph 200 based on their social-graph attributes and their relation to various social-graph elements. Structured queries may allow a querying user to search for content that is connected to particular users or concepts in the social graph 200 by particular edge-types. The structured queries may be sent to the first user and displayed in a drop-down menu 300 (via, for example, a client-side typeahead process), where the first user can then select an appropriate query to search for the desired content. Some of the advantages of using the structured queries described herein include finding users of the online social network based upon limited information, bringing together virtual indexes of content from the online social network based on the relation of that content to various social-graph elements, or finding content related to you and/or your friends. Although this disclosure describes and FIGS. 4A-4B illustrate generating particular structured queries in a particular manner, this disclosure contemplates generating any suitable structured queries in any suitable manner.

In particular embodiments, the social-networking system 160 may receive from a querying/first user (corresponding to a first user node 202) an unstructured text query. As an example and not by way of limitation, a first user may want to search for other users who: (1) are first-degree friends of the first user; and (2) are associated with Stanford University (i.e., the user nodes 202 are connected by an edge 206 to the concept node 204 corresponding to the school "Stanford"). The first user may then enter a text query "friends stanford" into query field 350, as illustrated in FIGS. 4A-4B. As the querying user enters this text query into query field 350, the social-networking system 160 may provide various suggested structured queries, as illustrated in drop-down menus 300. As used herein, an unstructured text query refers to a simple text string inputted by a user. The text query may, of course, be structured with respect to standard language/grammar rules (e.g. English language grammar). However, the text query will ordinarily be unstructured with respect to social-graph elements. In other words, a simple text query will not ordinarily include embedded references to particular social-graph elements. Thus, as used herein, a structured query refers to a query that contains references to particular social-graph elements, allowing the search engine to search based on the identified elements. Furthermore, the text query may be unstructured with respect to formal query syntax. In other words, a simple text query will not necessarily be in the format of a query command that is directly executable by a search engine (e.g., the text query "friends stanford" could be parsed to form the query command "intersect(school(Stanford University), friends(me)", or "/search/me/friends/[node ID for Stanford University]/students/ever-past/intersect", which could be executed as a query in a social-graph database). Although this disclosure describes receiving particular queries in a particular manner, this disclosure contemplates receiving any suitable queries in any suitable manner.

In particular embodiments, social-networking system 160 may parse the unstructured text query (also simply referred to as a search query) received from the first user (i.e., the querying user) to identify one or more n-grams. In general, an n-gram is a contiguous sequence of n items from a given sequence of text or speech. The items may be characters, phonemes, syllables, letters, words, base pairs, prefixes, or other identifiable items from the sequence of text or speech. The n-gram may comprise one or more characters of text (letters, numbers, punctuation, etc.) entered by the querying user. An n-gram of size one can be referred to as a "unigram," of size two can be referred to as a "bigram" or "digram," of size three can be referred to as a "trigram," and so on. Each n-gram may include one or more parts from the text query received from the querying user. In particular embodiments, each n-gram may comprise a character string (e.g., one or more characters of text) entered by the first user. As an example and not by way of limitation, the social-networking system 160 may parse the text query "friends stanford" to identify the following n-grams: friends; stanford; friends stanford. As another example and not by way of limitation, the social-networking system 160 may parse the text query "friends in palo alto" to identify the following n-grams: friends; in; palo; alto; friends in; in palo; palo alto; friend in palo; in palo also; friends in palo alto. In particular embodiments, each n-gram may comprise a contiguous sequence of n items from the text query. Although this disclosure describes parsing particular queries in a particular manner, this disclosure contemplates parsing any suitable queries in any suitable manner.

In particular embodiments, social-networking system 160 may identify a plurality of nodes or a plurality of edges corresponding to one or more of the n-grams of a text query. Identifying social-graph elements that correspond to an n-gram may be done in a variety of manners, such as, for example, by determining or calculating, for each n-gram identified in the text query, a score that the n-gram corresponds to a social-graph element. The score may be, for example, a confidence score, a probability, a quality, a ranking, another suitable type of score, or any combination thereof. As an example and not by way of limitation, the social-networking system 160 may determine a probability score (also referred to simply as a "probability") that the n-gram corresponds to a social-graph element, such as a user node 202, a concept node 204, or an edge 206 of social graph 200. The probability score may indicate the level of similarity or relevance between the n-gram and a particular social-graph element. There may be many different ways to calculate the probability. The present disclosure contemplates any suitable method to calculate a probability score for an n-gram identified in a search query. In particular embodiments, the social-networking system 160 may determine a probability, p, that an n-gram corresponds to a particular social-graph element. The probability, p, may be calculated as the probability of corresponding to a particular social-graph element, k, given a particular search query, X. In other words, the probability may be calculated as $p=(k|X)$. As an example and not by way of limitation, a probability that an n-gram corresponds to a social-graph element may calculated as an probability score denoted as $p_{i,j,k}$. The input may be a text query $X=(x_1, x_2, \ldots, x_N)$, and a set of classes. For each (i:j) and a class k, the social-networking system 160 may compute $p_{i,j,k}=p(\text{class} (x_{i:j})=k|X)$. As an example and not by way of limitation, the n-gram "stanford" could be scored with respect to the following social-graph elements as follows: school "Stanford University"=0.7; location "Stanford, Calif."=0.2; user "Allen Stanford"=0.1. In this example, because the n-gram "stanford" corresponds to multiple social-graph elements, it may be considered an ambiguous n-gram by the social-networking system 160. In other words, the n-gram is not immediately resolvable to a single social-graph element based on the parsing algorithm used by the social-networking system 160. In particular embodiments, after identifying an ambiguous n-gram, the social-networking system 160 may highlight that n-gram in the text query to indicate that it may correspond to multiple social-graph elements. As an example and not by way of limitation, as illustrated in FIG. 4B the term "Stanford" in query field 350 has been highlighted with a dashed-underline to indicate that it may correspond to multiple social-graph elements, as discussed previously. Although this disclosure describes determining whether n-grams correspond to social-graph elements in a particular manner, this disclosure contemplates determining whether n-grams correspond to social-graph elements in any suitable manner. Moreover, although this disclosure describes determining whether an n-gram corresponds to a social-graph element using a particular type of score, this disclosure contemplates determining whether an n-gram corresponds to a social-graph element using any suitable type of score.

More information on element detection and parsing queries may be found in U.S. patent application Ser. No. 13/556, 072, filed 23 Jul. 2012, U.S. patent application Ser. No. 13/731,866, filed 31 Dec. 2012, and U.S. patent application Ser. No. 13/732,101, filed 31 Dec. 2012, each of which is incorporated by reference.

Generating Structured Search Queries

In particular embodiments, the social-networking system 160 may access a context-free grammar model comprising a plurality of grammars. Each grammar of the grammar model may comprise one or more non-terminal tokens (or "non-terminal symbols") and one or more terminal tokens (or "terminal symbols"/"query tokens"), where particular non-terminal tokens may be replaced by terminal tokens. A grammar model is a set of formation rules for strings in a formal language. Although this disclosure describes accessing particular grammars, this disclosure contemplates any suitable grammars.

In particular embodiments, the social-networking system 160 may generate one or more strings using one or more grammars. To generate a string in the language, one begins with a string consisting of only a single start symbol. The production rules are then applied in any order, until a string that contains neither the start symbol nor designated non-terminal symbols is produced. In a context-free grammar, the production of each non-terminal symbol of the grammar is independent of what is produced by other non-terminal symbols of the grammar. The non-terminal symbols may be replaced with terminal symbols (i.e., terminal tokens or query tokens). Some of the query tokens may correspond to identified nodes or identified edges, as described previously. A string generated by the grammar may then be used as the basis for a structured query containing references to the identified nodes or identified edges. The string generated by the grammar may be rendered in a natural-language syntax, such that a structured query based on the string is also rendered in natural language. A context-free grammar is a grammar in which the left-hand side of each production rule consists of only a single non-terminal symbol. A probabilistic context-free grammar is a tuple $\langle \Sigma, N, S, P \rangle$, where the disjoint sets $\Sigma$ and N specify the terminal and non-terminal symbols, respectively, with $S \in N$ being the start symbol. P is the set of productions, which take the form $E \to \xi(p)$, with $E \in N$, $\xi \in (\Sigma \cup N)^+$, and $p = \Pr(E \to \xi)$, the probability that E will be expanded into the string $\xi$. The sum of probabilities p over all expansions of a given non-terminal E must be one. Although this disclosure describes generating strings in a particular manner, this disclosure contemplates generating strings in any suitable manner.

Figure 12A:
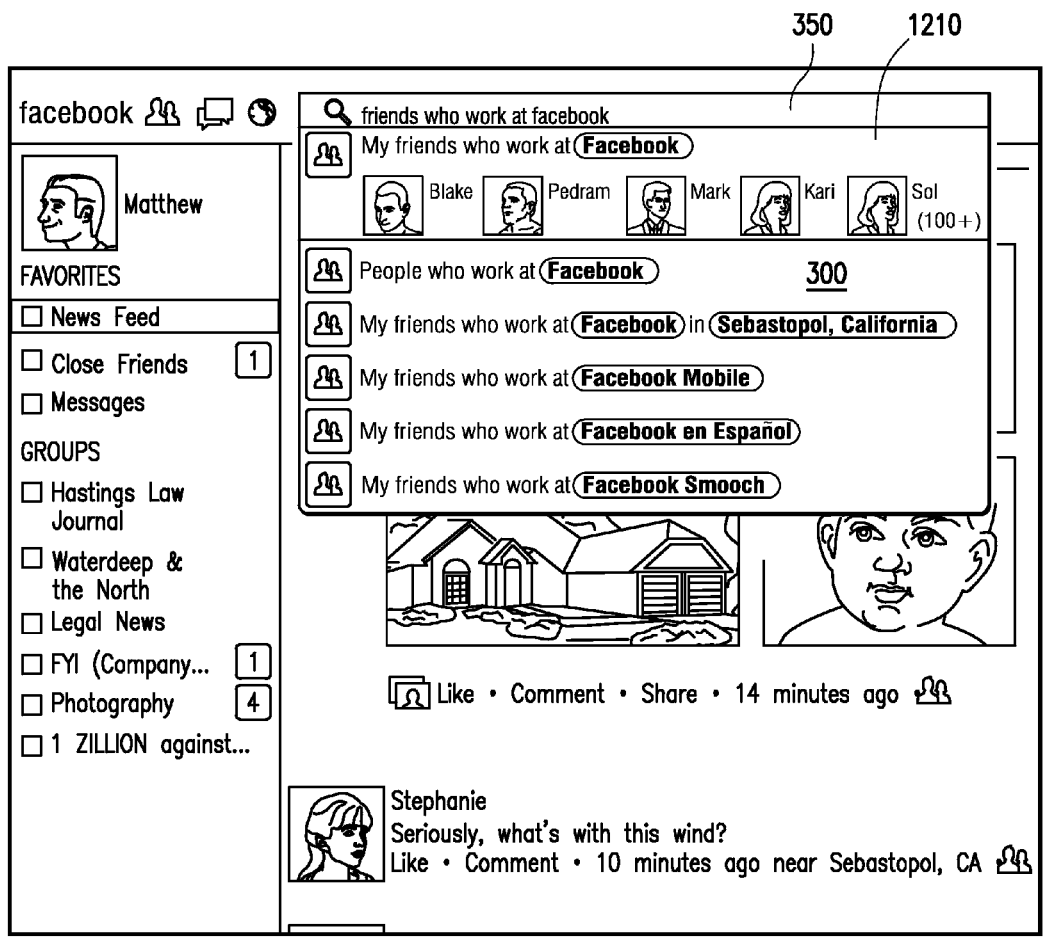

In particular embodiments, the social-networking system 160 may generate one or more structured queries. The structured queries may be based on the natural-language strings generated by one or more grammars, as described previously. Each structured query may include references to one or more of the identified nodes or one or more of the identified edges 206. This type of structured query may allow the social-networking system 160 to more efficiently search for resources and content related to the online social network (such as, for example, profile pages) by searching for content connected to or otherwise related to the identified user nodes 202 and the identified edges 206. As an example and not by way of limitation, in response to the text query, "show me friends of my girlfriend," the social-networking system 160 may generate a structured query "Friends of Stephanie," where "Friends" and "Stephanie" in the structured query are references corresponding to particular social-graph elements. The reference to "Stephanie" would correspond to a particular user node 202 (where the social-networking system 160 has parsed the n-gram "my girlfriend" to correspond with a user node 202 for the user "Stephanie"), while the reference to "Friends" would correspond to friend-type edges 206 connecting that user node 202 to other user nodes 202 (i.e., edges 206 connecting to "Stephanie's" first-degree friends). When executing this structured query, the social-networking system 160 may identify one or more user nodes 202 connected by friend-type edges 206 to the user node 202 corresponding to "Stephanie". As another example and not by way of limitation, as illustrated in FIG. 12A, in response to the text query, "friends who work at facebook," the social-networking system 160 may generate a structured query "My friends who work at Facebook," where "my friends," "work at," and "Facebook" in the structured query are references corresponding to particular social-graph elements as described previously (i.e., a friend-type edge 206, a work-at-type edge 206, and concept node 204 corresponding to the company "Facebook"). These structured queries may be pre-generated and accessed from a cache or generated dynamically in response to input from the user. Although this disclosure describes generating particular structured queries in a particular manner, this disclosure contemplates generating any suitable structured queries in any suitable manner.

In particular embodiments, social-networking system 160 may score the generated structured queries. The score may be, for example, a confidence score, a probability, a quality, a ranking, another suitable type of score, or any combination thereof. The structured queries may be scored based on a variety of factors, such as, for example, the page or type of page the user is accessing, user-engagement factors, business-intelligence data, the click-thru rate of particular queries, the conversion-rate of particular queries, user-preferences of the querying user, the search history of the user, advertising sponsorship of particular queries, the querying user's social-graph affinity for social-graph elements referenced in particular queries, the intent of the user, the general or current popularity of particular queries, the usefulness of particular queries, the geographic location of the user, other suitable factors, or any combination thereof. Although this disclosure describes ranking structured queries in a particular manner, this disclosure contemplates ranking structured queries in any suitable manner.

In particular embodiments, social-networking system 160 may send one or more of the structured queries to the querying user. As an example and not by way of limitation, after the structured queries are generated, the social-networking system 160 may send one or more of the structured queries as a response (which may utilize AJAX or other suitable techniques) to the user's client system 130 that may include, for example, the names (name strings) of the referenced social-graph elements, other query limitations (e.g., Boolean operators, etc.), as well as, potentially, other metadata associated with the referenced social-graph elements. The web browser 132 on the querying user's client system 130 may display the sent structured queries in a drop-down menu 300, as illustrated in FIGS. 4A-4B. In particular embodiments, the sent queries may be presented to the querying user in a ranked order, such as, for example, based on a rank previously determined as described above. Structured queries with better rankings may be presented in a more prominent position. Furthermore, in particular embodiments, only structured queries above a threshold rank may be sent or displayed to the querying user. As an example and not by way of limitation, as illustrated in FIGS. 4A-4B, the structured queries may be presented to the querying user in a drop-down menu 300 where higher ranked structured queries may be presented at the top of the menu, with lower ranked structured queries presented in descending order down the menu. In the examples illustrated in FIGS. 4A-4B, only the seven highest ranked queries are sent and displayed to the user. In particular embodiments, one or more references in a structured query may be highlighted (e.g., outlined, underlined, circled, bolded, italicized, colored, lighted, offset, in caps) in order to indicate its correspondence to a particular social-graph element. As an example and not by way of limitation, as illustrated in FIG. 4B, the references to "Stanford University" and "Stanford, Calif." are highlighted (outlined) in the structured queries to indicate that it corresponds to a particular concept node 204. Similarly, the references to "Friends", "like", "work at", and "go to" in the structured queries presented in drop-down menu 300 could also be highlighted to indicate that they correspond to particular edges 206. Although this disclosure describes sending particular structured queries in a particular manner, this disclosure contemplates sending any suitable structured queries in any suitable manner.

In particular embodiments, social-networking system 160 may receive from the querying user a selection of one of the structured queries. The nodes and edges referenced in the received structured query may be referred to as the selected nodes and selected edges, respectively. As an example and not by way of limitation, the web browser 132 on the querying user's client system 130 may display the sent structured queries in a drop-down menu 300, as illustrated in FIGS. 4A-4B, which the user may then click on or otherwise select (e.g., by touching the query on a touchscreen or keying "enter" on his keyboard) to indicate the particular structured query the user wants the social-networking system 160 to execute. Although this disclosure describes receiving selections of particular structured queries in a particular manner, this disclosure contemplates receiving selections of any suitable structured queries in any suitable manner.

More information on structured search queries and grammar models may be found in U.S. patent application Ser. No. 13/556,072, filed 23 Jul. 2012, U.S. patent application Ser. No. 13/674,695, filed 12 Nov. 2012, and U.S. patent application Ser. No. 13/731,866, filed 31 Dec. 2012, each of which is incorporated by reference.

Generating Default Queries for a Page

Figure 5A:
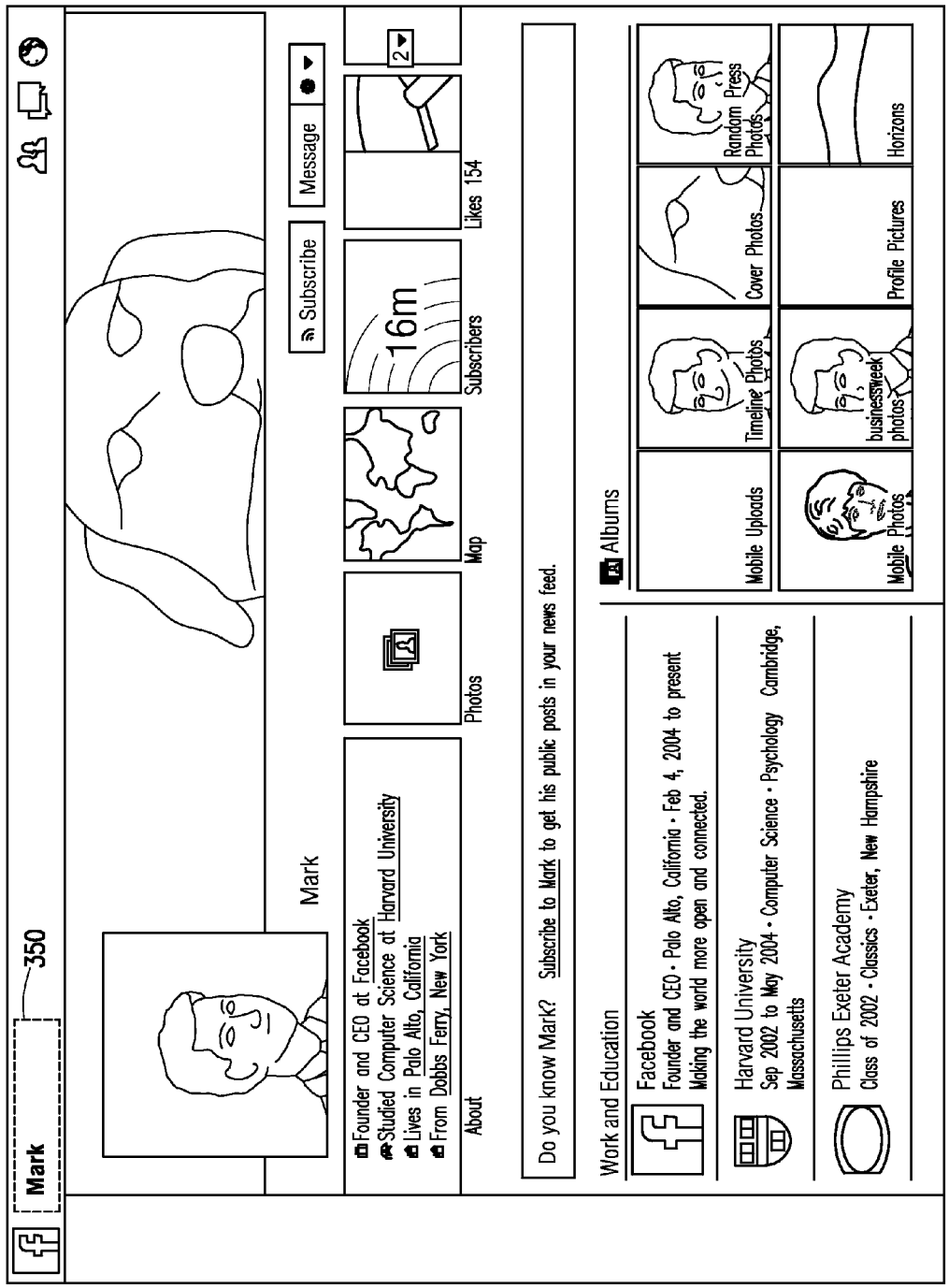
FIGS. 5A-5D illustrate example pages of an online social network.
Figure 5B:
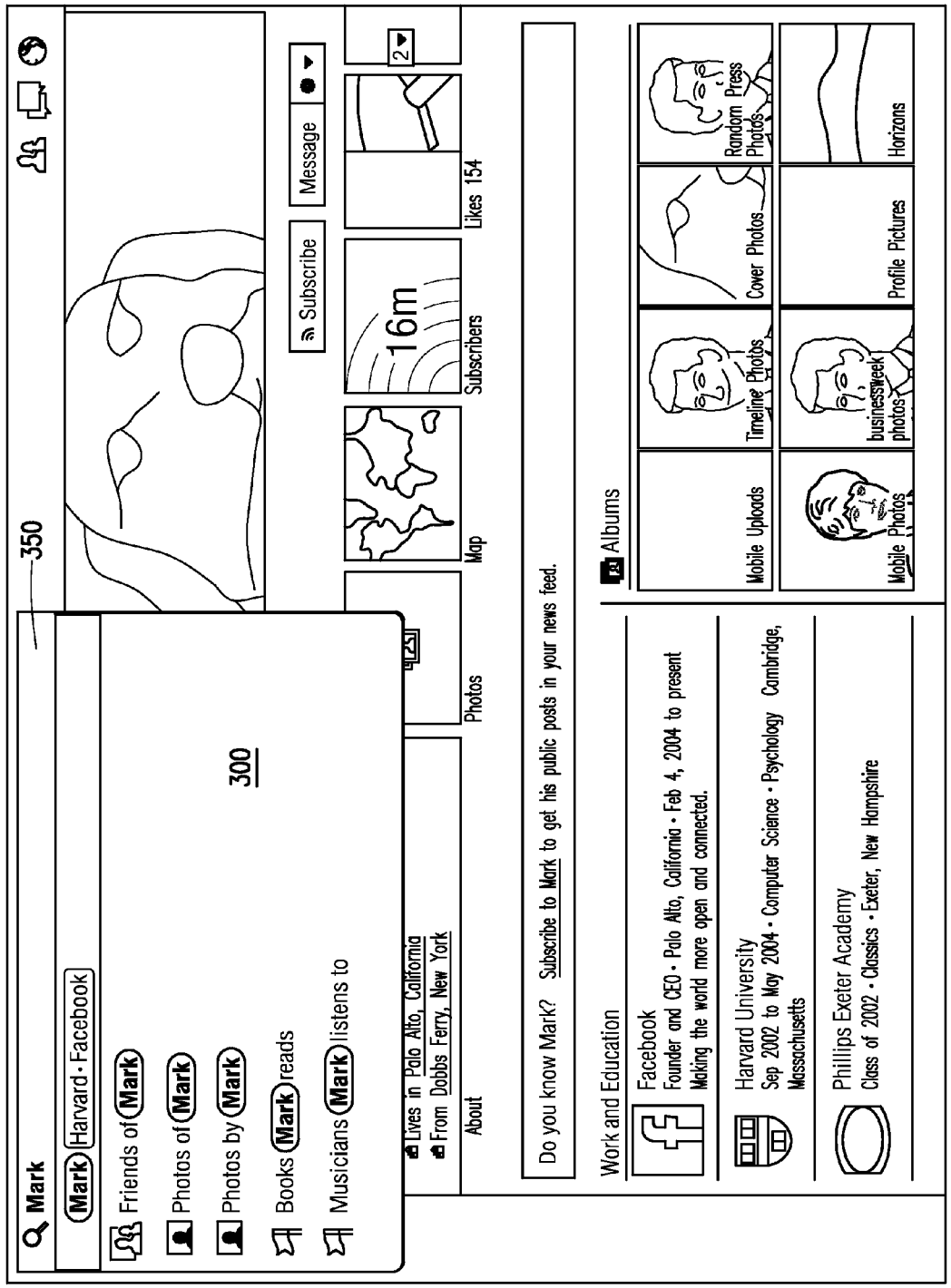
Figure 5C:
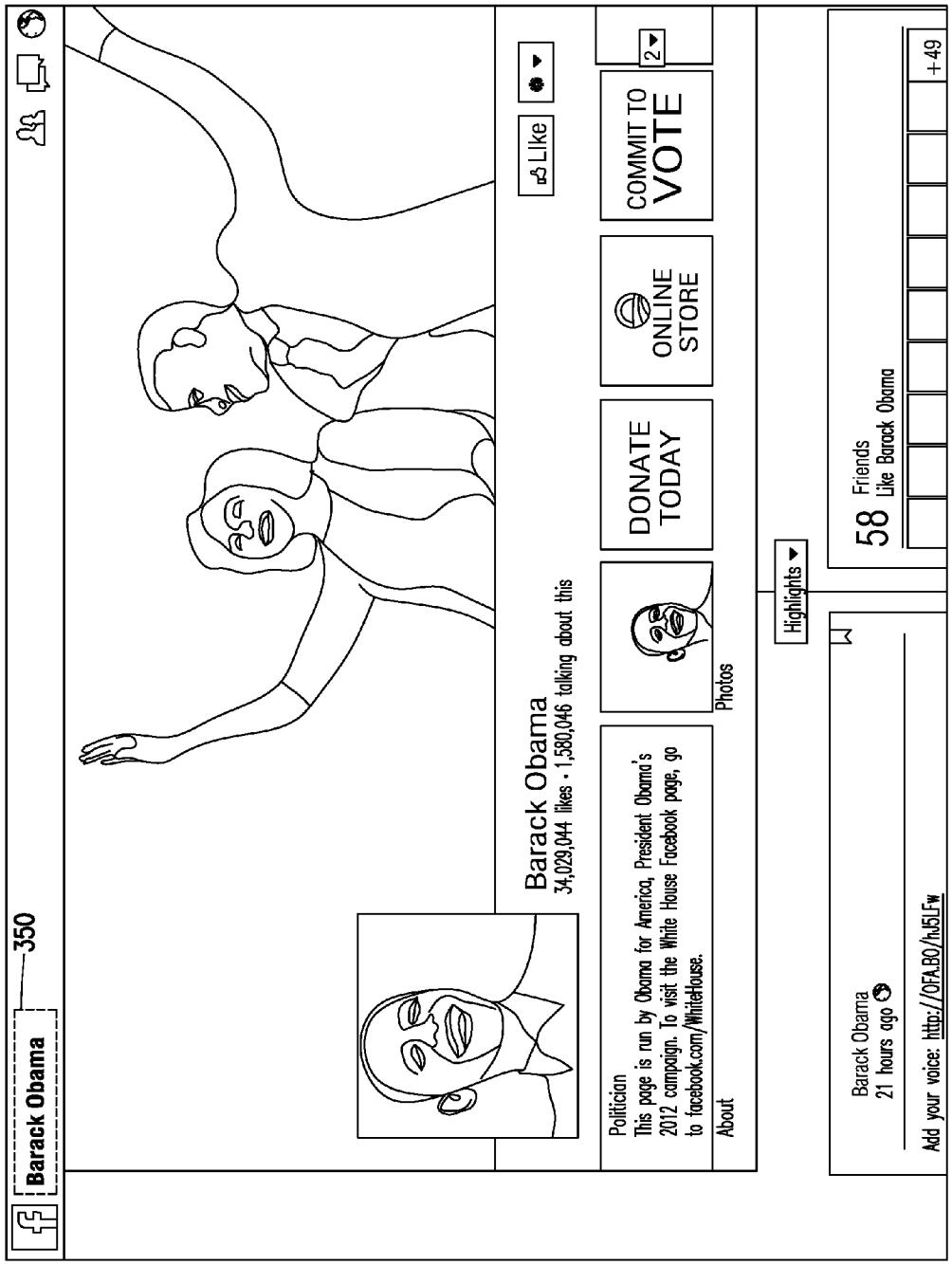

FIGS. 5A-5D illustrate example pages of an online social network. In particular embodiments, the social-networking system 160 may generate a set of default structured queries for a page of the online social network. The social-networking system 160 may identify a page that a user is currently viewing or otherwise accessing and then identifying any social-graph elements corresponding to that page. The social-graph elements corresponding to a page may be, for example, the node corresponding to a user- or concept-profile page, or the nodes/edges referenced in a structured query used to generate a particular search-results page. The social-networking system 160 may then generate a set of default structured queries for the page based on the identified social-graph elements for that page. As an example and not by way of limitation, referencing FIG. 5B, when accessing a user-profile page for the user "Mark", which corresponds to the user node 202 for "Mark", some of the default structured queries for that page may include "Friends of Mark" or "Photos of Mark", as illustrated in drop-down menu 300, where each of these structured queries includes a reference to the user node 202 of the user "Mark". The generated default structured queries may then be sent to the user and displayed, for example, in a drop-down menu 300. In particular embodiments, the query field 350 may also serve as the title bar for the page. In other words, the title bar and query field 350 may effectively be a unified field on a particular page. The title bar for a page of the online social network may include a reference to the social-graph elements that correspond to that page. As an example and not by way of limitation, referencing is user-profile pages illustrated in FIGS. 5C-5D, the title bar across the top of the page includes the name of the concept corresponding to that page, "Barack Obama". This title bar may also server as a query field 350 for the page. As such, a user accessing that page may then interact with the title of the page (e.g., by mousing over the title, clicking on it, or otherwise interacting with it), to input a query. In response to a user interacting with the title/query field, the social-networking system 160 may then generate a set of default structured queries for the page and automatically send and display these queries in a drop-down menu 300 on the page, as illustrated in FIG. 5B, where the drop-down menu 300 is displayed in association with the query field 350. Although this disclosure describes generating default queries for a page in a particular manner, this disclosure contemplates generating default queries for a page in any suitable manner.

In particular embodiments, the social-networking system 160 may identify a node of the social-graph 200 corresponding to a page currently accessed by a user. A user may access any suitable page, such as, for example, a user-profile page, a concept-profile page, a search-results page, a homepage, a newsfeed page, a notifications page, an email or messages page, a user interface of a native application associated with the online social network, or another suitable page of the online social network. Particular pages of the online social network may correspond to particular social-graph elements. In particular embodiments, the user may currently be accessing a profile page of the online social network corresponding to a particular user node 202 or concept node 204. Each user of the online social network may have a user-profile page that corresponds to a user node 202 of the user. As an example and not by way of limitation, referencing FIGS. 5A-5B, which illustrate a user-profile page for the user "Mark", this page may correspond to a user node 202 of the user "Mark". Similarly, each concept represented in the online social network may have a concept-profile page that corresponds to a concept node 204 representing that concept. As an example and not by way of limitation, referencing FIGS. 5C-5D, which illustrate a concept-profile page for the politician "Barack Obama", this page may correspond to a concept node 204 representing the politician "Barack Obama" (note, of course, that Barack Obama may also have a personal user-profile page). In particular embodiments, the user may currently be accessing a search-results page corresponding to a structured query. The structured query may comprise references to one or more nodes and one or more edges, and the search-results page may have been generated in response to this structured query. In this case, one or more of the nodes referenced in the structured query may be identified by the social-networking system 160 as being the nodes corresponding to the page. Although this disclosure describes identifying particular nodes corresponding to particular pages in a particular manner, this disclosure contemplates identifying any suitable nodes corresponding to any suitable pages in any suitable manner.

In particular embodiments, the social-networking system 160 may generate one or more structured queries that each comprise a reference to the identified node(s) of the page currently accessed by a user. These generated structured queries may be considered the default structured queries for the page. Each of these structured queries may also comprise references to one or more edges that are connected to the identified node. These default structured queries are effectively based on and reference the page currently being accessed by the user. Where the title bar and the query field 350 field are unified fields, as described previously, the social-networking system 160 may essentially use the title of the page (which itself may be considered a reference to one or more social-graph elements) as a template query upon which query modifications are added to generate the default structured queries. As an example and not by way of limitation, referencing FIG. 5D, the title of the page is "Barack Obama", where this title is unified with the query field 350, such that a user may interact with the title to immediately bring up a drop-down menu 300 with a set of default queries for the page that reference the page the user is interacting with (i.e., the suggested default queries contain references to the concept-node 204 associated with the concept "Barack Obama"). In particular embodiments, if the user is accessing a search-results page, then the default structured queries generated by the social-networking system 160 may comprises references to the social-graph elements referenced in the structured query used to generate that search-results page. In other words, if a structured query comprising references to one or more nodes and one or more edges is used to generate a particular search-results page, then the default structured queries generated for that page will also include at least references to the one or more nodes and one or more edges of the original structured query. Thus, the structured query used to generate a particular search-results page may be used as the base upon which expansions of that initial query may be suggested as default queries. Although this disclosure describes generating particular default structured queries in a particular manner, this disclosure contemplates any suitable default structured queries in any suitable manner. Moreover, although this disclosure describes generating default structured queries for particular types of pages, this disclosure contemplates generating default structured queries for any suitable types of pages.

Figure 5D:
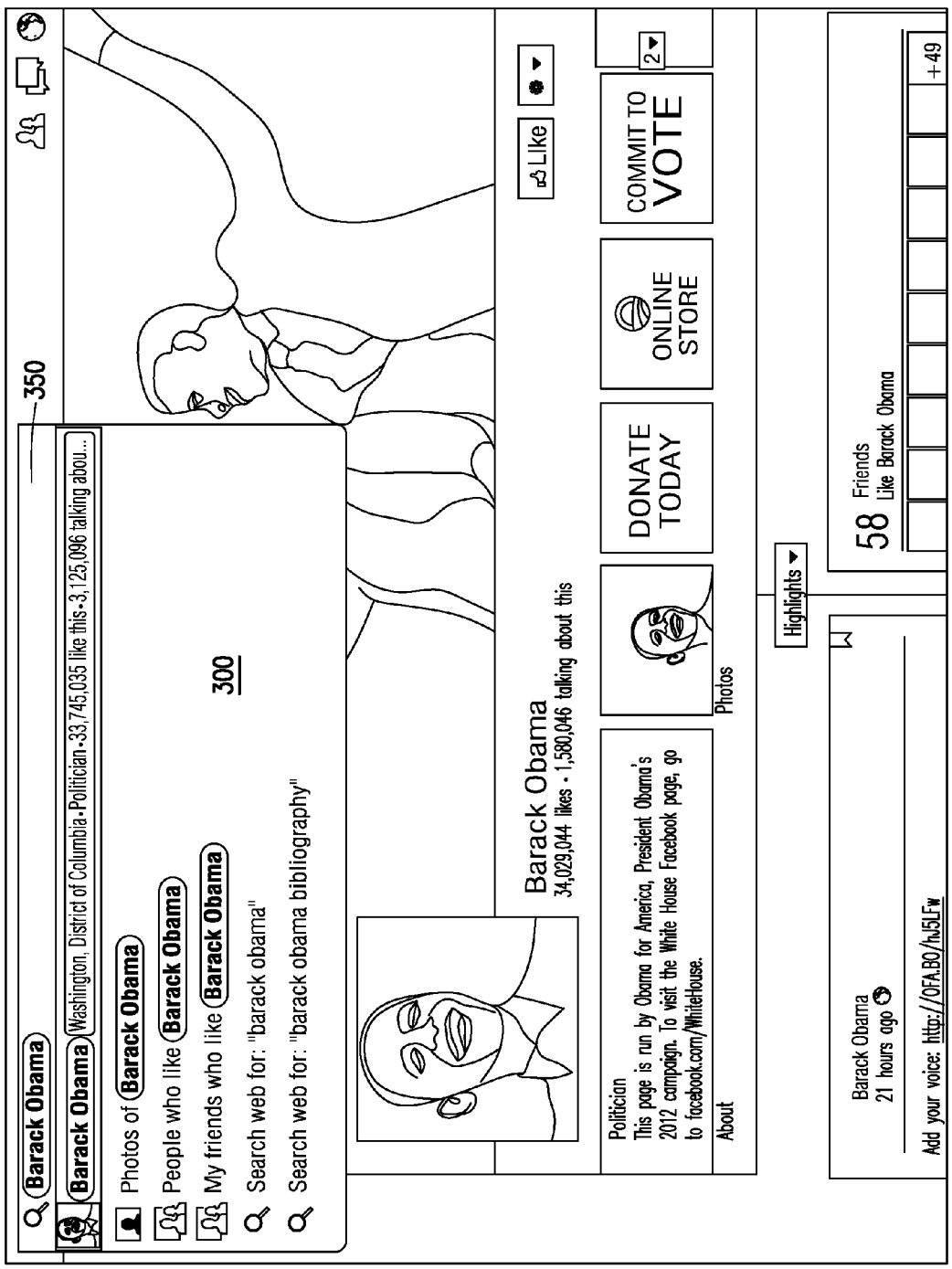

In particular embodiments, the social-networking system 160 may send one or more of the default structured queries to the querying user for display on the page currently accessed by the user. These structured queries may be sent and displayed as previously described. As an example and not by way of limitation, the web browser 132 on the querying user's client system 130 may display the sent structured queries in a drop-down menu 300 in association with a query field 350 of a page, as illustrated in FIGS. 5B and 5D. The default structured queries generated for a particular page may not be displayed until the user interacts with the query field 350, such as, for example, by mousing over or clicking on the query field 350, which may cause the structured queries to be sent and displayed in drop-down menu 300. The structured queries displayed in drop-down menu 300 may enable the user accessing the page to selected one of the structured queries, indicating that the selected structured query should be executed by the social-networking system 160. Although this disclosure describes sending particular default structured queries in a particular manner, this disclosure contemplates sending any suitable default structured queries in any suitable manner.

In particular embodiments, the social-networking system 160 may generate one or more default structured queries in response to a user accessing a page that does not correspond to a particular social-graph element. A user may access a page of the online social network that does not necessarily correspond to any particular social-graph element (such as, for example, a newsfeed page, which may not necessarily correspond to any particular nodes or edges of the social graph 200). In this case, the page may be considered to be in a "null state" with respect to identifying social-graph elements that correspond to the page. Similarly, for a page that does correspond to one or more social-graph elements, the user accessing that page may place the query field 350 of the page into a null state by, for example, clearing or deleting any title or query that that had previously occupied the field. For a null-state page (or a query field 350 in a null state), the social-networking system 160 may generate a set of default structured queries for the page based on a variety of factors, such as, for example, the page or type of page the user is accessing, user-engagement factors, business-intelligence data, the click-thru rate of particular queries, the conversion-rate of particular queries, user-preferences of the querying user, the search history of the user, advertising sponsorship of particular queries, the querying user's social-graph affinity for social-graph elements referenced in particular queries, the intent of the user, the general or current popularity of particular queries, the usefulness of particular queries, the geographic location of the querying user, other suitable factors, or any combination thereof. In particular embodiments, when the user is accessing a page that does not correspond to a particular social-graph element, the social-networking system 160 may access a set of default structured queries corresponding to the page. Each of these default structured queries may comprise references to one or more edges 206 (or edge-types) or one or more nodes (or node-types). As an example and not by way of limitation, FIG. 3 illustrates a newsfeed page being accessed by a user of the online social network. Some of the default structured queries for this page may include "Friends of . . . " or "People who like . . . ", as illustrated in drop-down menu 300, where these structured queries included references to friend-type edges 206 and like-type edges 206, respectively. In the example illustrated in FIG. 3, the default structured queries contain ellipses to indicate that the user may input text into the query field 350 to complete the query. As another example and not by way of limitation, for the same newsfeed page illustrated in FIG. 3, the social-networking system 160 may generate default structured queries that include "My friends", "Photos of my friends", "Photos I like", or "Apps my friends use", where these structured queries include reference to both edges and nodes (e.g., for the structured query "My friends", the term "My" is a reference to the user node 202 of the querying user and the term "friends" is a reference to friend-type edges 206 connected to that node). Although this disclosure describes generating default structured queries for a page that does not correspond to particular social-graph elements in a particular manner, this disclosure contemplates generating default structured queries for a page that does not correspond to particular social-graph elements in any suitable manner.

Figure 6:
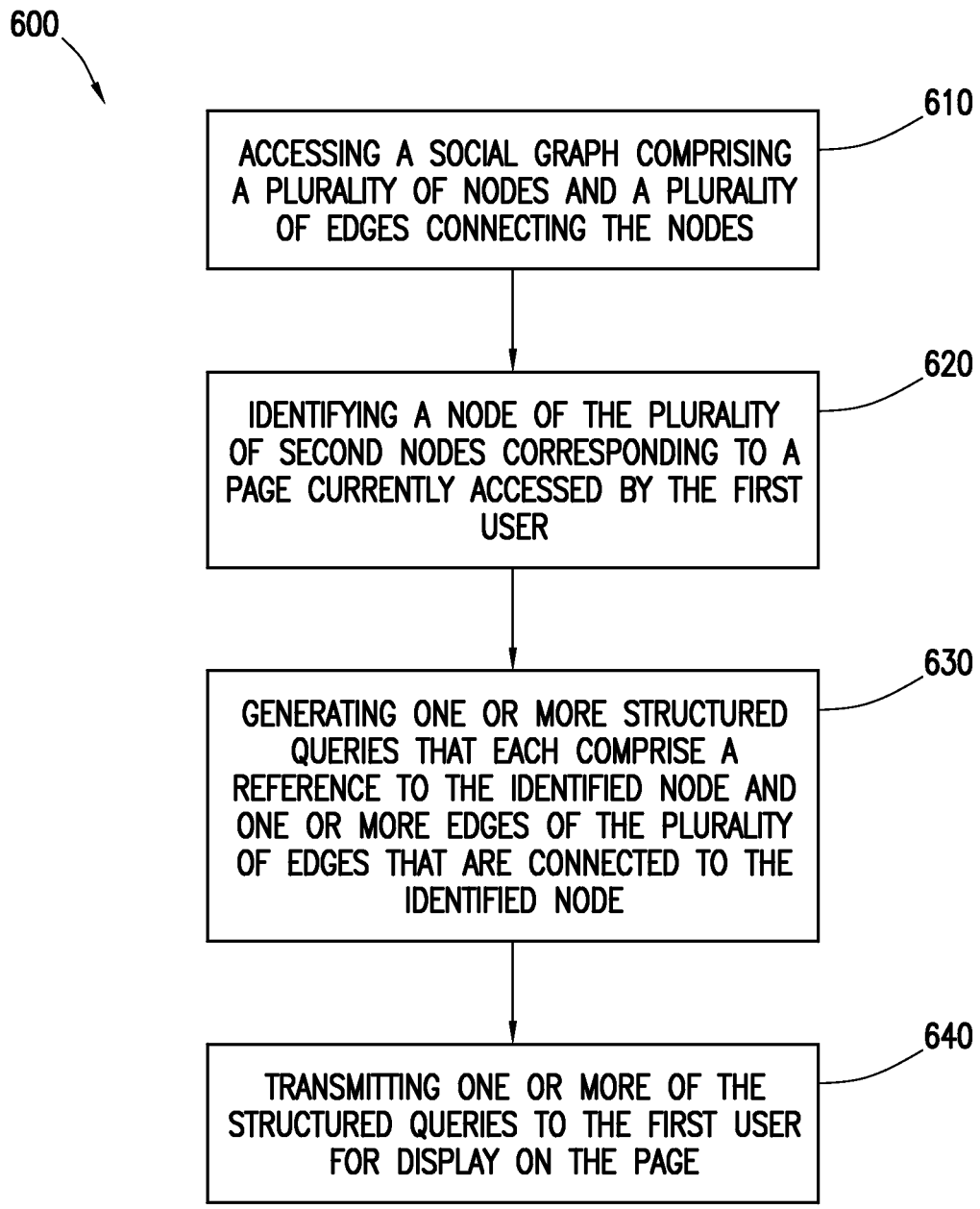
FIG. 6 illustrates an example method for generating default structured search queries for a page.

FIG. 6 illustrates an example method 600 for generating default structured search queries for a page. The method may begin at step 610, where the social-networking system 160 may access a social graph 200 comprising a plurality of nodes and a plurality of edges 206 connecting the nodes. The nodes may comprise a first user node 202 and a plurality of second nodes (one or more user nodes 202, concepts nodes 204, or any combination thereof). At step 620, the social-networking system 160 may identify a node of the plurality of nodes corresponding to a page currently accessed by the first user. The page may be, for example, a user-profile page, a concept-profile page, a search-results page, or another suitable page of the online social network. At step 630, the social-networking system 160 may generate one or more structured queries. Each of these structured queries may reference the identified node corresponding to the page currently accessed by the first user. The structured queries may also reference one or more edges of the plurality of edges that are connected to the identified node. At step 640, the social-networking system 160 may send one or more of the structured queries to the first user for display on the page. These may be considered the default structured queries for the page, which have been determined based on the social-graph elements associated with the page. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7A:
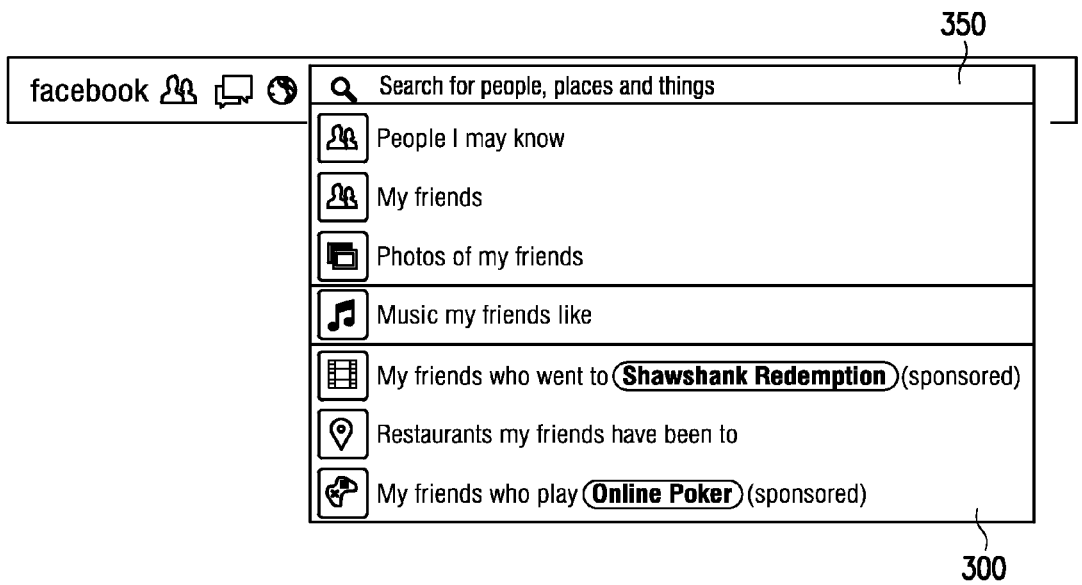
FIGS. 7A-7C illustrate example default queries of the online social network.
Figure 7B:
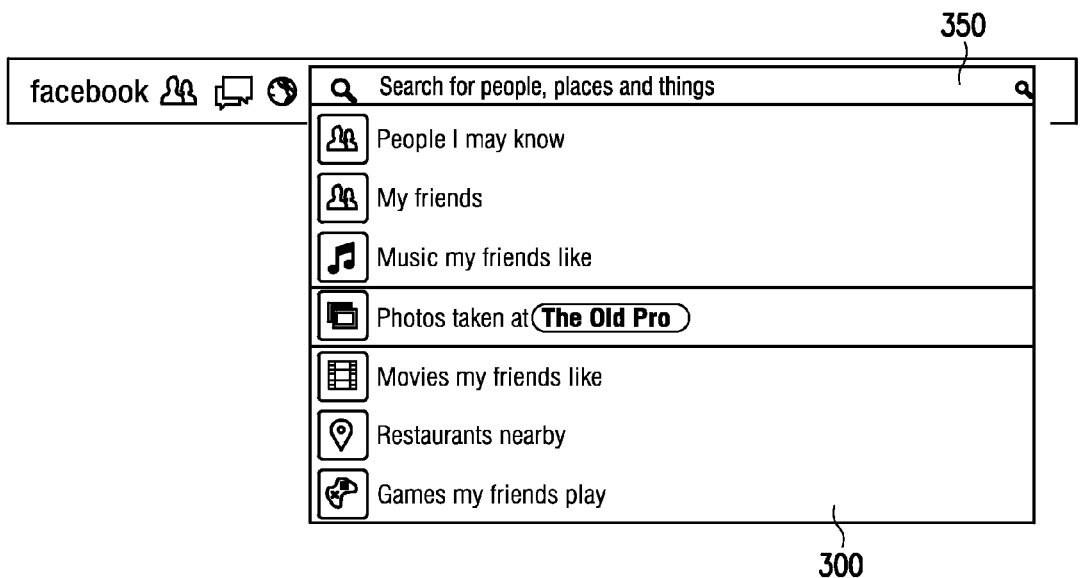
Figure 7C:

FIGS. 7A-7C illustrate example default queries of the online social network. In particular embodiments, social-networking system 160 may generate suggested structured queries for a user based on one or more user-engagement factors. It may be desirable for social-networking system 160 to provide users with structured queries that are more interesting to the user and thus more likely to be engaged with (e.g., selected or clicked-thru). A variety of factors may be used to increase user engagement, such as, for example, business-intelligence, user-preference/history, social-graph affinity, advertising sponsorship, or other suitable factors may be used to determine which suggested queries to serve to the user. Social-networking system 160 may calculate which structured queries are more likely to be engaged with by a user, and then send suggested queries to the user that the user is more likely to engage with. As an example and not by way of limitation, social-networking system 160 may generate a set of possible suggested queries, and score sponsored queries more highly than other queries, and these sponsored queries may then be sent to the querying user. For example, FIG. 7A illustrates a set of example default queries, where the suggested queries "My friends who went to Shawshank Redemption" and "My friends who play Online Poker" are sponsored queries, and indicated as such. The references to "Shawshank Redemption" and "Online Poker" are references to particular concept nodes 204 of social graph 200 corresponding to the movie "Shawshank Redemption" and the game "Online Poker", respectively. As another example and not by way of limitation, social-networking system 160 may generate suggested queries based on the general or current popularity of particular queries, and score popular queries more highly than less popular queries. For example, FIGS. 7B and 7C illustrate what could be examples of queries users may be likely to engage with, "Ben Affleck's movies" or "Photos taken at The Old Pro". The references to "Ben Affleck" and "The Old Pro" are references to particular nodes of social graph 200 corresponding to the actor "Ben Affleck" and the location "The Old Pro", respectively. These queries may be scored highly because, for example, they are popular among other users of the online social network, and based on their popularity they may be generated and sent to the querying user. Although this disclosure describes generating structured queries for a user in a particular manner, this disclosure contemplates generating structured queries for a user in any suitable manner.

In particular embodiments, the social-networking system 160 may calculate a score for each structured query based on one or more user-engagement factors. A user-engagement factor provides a metric for measuring the engagement of a user of the online social network, such as, for example, by engaging with other users, concepts, content, etc. The score may be, for example, a confidence score, a probability, a quality, a ranking, another suitable type of score, or any combination thereof. As an example and not by way of limitation, the score for each structured query may represent a probability that the first user will engage with the structured query. As another example and not by way of limitation, the score may represent estimate of the degree and depth of user interaction with particular objects against a clearly defined set of goals. Scoring based on user-engagement factors may be based on a variety of factors, such as, for example, the page or type of page the user is accessing, business-intelligence data, the click-thru rate of particular queries, the conversion-rate of particular queries, user-preferences of the querying user, the search history of the user, advertising sponsorship of particular queries, the querying user's social-graph affinity for social-graph elements referenced in particular queries, the intent of the user, the geographic location of the user, the general or current popularity of particular queries, the usefulness of particular queries, other suitable factors, or any combination thereof. Although this disclosure describes scoring particular structured queries in a particular manner, this disclosure contemplates scoring structured queries in any suitable manner.

In particular embodiments, social-networking system 160 may calculate the score for a structured query based at least in part on business-intelligence data. In this context, business-intelligence data refers to data gathered by social-networking system 160 that helps predict or identify queries that users are more likely to engage with, or queries that promote one or more business goals. The business-intelligence data may be data related particular to the querying user, or related to other users of the online social network. As an example and not by way of limitation, social-networking system 160 may use business-intelligence data relating to the querying user to identify queries or query-types that the first user is more likely to engage with. As another example and not by way of limitation, social-networking system 160 may use business-intelligence data relating to one or more other users of the online social network (e.g., users within a threshold-degree of separation, users within particular groups or networks, or all users of the online social network) to identify queries or query-types that those users have or are likely to engage with, and infer the likelihood of the querying user to engage with such queries.

In particular embodiments, social-networking system 160 may calculate the score for a structured query based at least in part on a click-thru rate for the structured query. Queries or query-types with higher click-thru rates are more likely to be selected or otherwise engaged with by the querying user. The click-thru rate may be for queries or query-types with respect to the querying user or other users of the online social network. As an example and not by way of limitation, social-networking system 160 may identify the click-thru rate for particular structured queries or query-types, and calculate higher scores for queries or query-types that have higher click-thru rates with respect to the querying user or other users.

In particular embodiments, social-networking system 160 may calculate the score for a structured query based at least in part on a conversion rate for the structured query. Queries or query-types with higher conversion rates are more likely to be further engaged with (e.g., the search results are more likely to be interacted with, sponsored results more likely to be clicked and purchases made, etc.) after selection by the querying user. The conversion rate may be for queries or query-types with respect to the querying user or other users of the online social network. As an example and not by way of limitation, social-networking system 160 may identify the conversion rate for particular structured queries or query-types, and calculate higher scores for queries or query-types that have higher conversion rates with respect to the querying user or other users.

In particular embodiments, social-networking system 160 may calculate the score for a structured query based at least in part on a user-preference of the querying user. The user-preferences could be specified by the querying user, other users (e.g., parents or employers of the querying user), system administrators, third-party systems 170, or otherwise determined by social-networking system 160. The user-preferences may specify, for example, queries or query-types the user is interested and not interested in receiving. As an example and not by way of limitation, social-networking system 160 may identify queries or query-types preferred by the querying user, as specified by the user-preference of the user, and calculate higher scores for queries or query-types that are specified as being preferred by the user (similarly, queries or query-types specified as being not preferred may be scored lower or completely excluded/assigned null scores).

In particular embodiments, social-networking system 160 may calculate the score for a structured query based at least in part on a search history users of the online social network. Structured queries that reference social-graph elements (or types of elements) that the querying user has previously accessed (or been accessed by other users that are relevant to the querying user, such as his friends), or are relevant to the social-graph elements the querying user has previously accessed, may be more likely to of interest to the querying user. Thus, these structured queries may be scored more highly. As an example and not by way of limitation, if querying user has previously visited the "Stanford University" profile page but has never visited the "Stanford, Calif." profile page, when determining the score for structured queries referencing these concepts, the social-networking system 160 may determine that the structured query referencing the concept node 204 for "Stanford University" has a relatively high score because the querying user has previously accessed the concept node 204 for the school. As another example and not by way of limitation, if the querying user has previously selected queries of particular query-types, and not selected other types of queries, then when scoring structured queries of particular types, social-networking system 160 may score query-types previously selected by the querying user higher than other query-types.

In particular embodiments, social-networking system 160 may calculate the score for a structured query based at least in part on whether the structured query is a sponsored query. An advertiser (such as, for example, the user or administrator of a particular profile page corresponding to a particular node) may sponsor a particular node such that a structured query referencing that node may be scored more highly. Sponsored queries are discussed in more detail below.

In particular embodiments, social-networking system 160 may calculate the score for a structured query based at least in part on a social-graph affinity of the user node 202 corresponding to the querying user with respect to one or more of the nodes referenced in the structured query. Structured queries that reference nodes having relatively high social-graph affinity (e.g., a high affinity coefficient) with respect to the querying user may be more likely to of interest to the querying user. Thus, these structured queries may be scored more highly. As an example and not by way of limitation, social-networking system 160 may score a structured query may be based on the degree of separation (which may be one measure of affinity) between the user node 202 of the querying user and the particular social-graph elements referenced in the structured query. Structured queries that reference social-graph elements that are closer in the social graph 200 to the querying user (i.e., fewer degrees of separation between the element and the querying user's user node 202) may be scored more highly than structured queries that reference social-graph elements that are further from the user (i.e., more degrees of separation).

In particular embodiments, social-networking system 160 may calculate the score for a structured query based at least in part on an intent of the querying user. In order to improve the likelihood a user will engage with a suggested query, the intent of the user may first be determined, and then suggested queries related to that intent may be generated and sent to the user. The determined intent(s) may correspond to particular queries or query-types, and queries matching the determined intent of the user may be scored more highly. The social-networking system 160 may determine the intent of the user based on a variety of factors, such as, for example, the time of day, the proximity of the user to other users or objects, social-graph information, social-graph affinity, the search history of the user, feedback from the user, the geographic location of the user, other relevant information about the user, or any combination thereof. More information on determining the intent of a querying user may be found in U.S. patent application Ser. No. 13/776,469, filed 25 Feb. 2013, which is incorporated by reference.

In particular embodiments, social-networking system 160 may generate one or more recommendation queries. In contrast to a suggested search query that searches for particular objects associated with the online social network based on particular search criteria, as described previously, a recommendation query is a query for things that might be interesting for the user to look at or discover. As an example and not by way of limitation, social-networking system 160 may generate a recommendation query such as "Books I should read", "Movies I should watch", "Photos you might like", or "People you might know", which can be sent to the querying user. In particular embodiments, the search results for a recommendation query could be generated by identifying content that may be of interest to the querying user (e.g., content "liked" or accessed by the user's friends) and subtracting out content that has already been discovered or looked at by the querying user (e.g., content the querying user has already liked or accessed), and then generating search results with the remainder. As an example and not by way of limitation, social-networking system 160 may receive from the first user a selection of one of the recommendation queries. For example, the querying user may select the recommendation query "Books I should read." In response, social-networking system 160 may then generate one or more search results corresponding to the selected recommendation query. Each search result may comprise a reference to a user node 202 or concept node 204 that not connected to the user node 202 corresponding to the querying user, but is connected to one or more other nodes corresponding to first-degree connections of the querying user (or connections within a threshold-degree of separation). In other words, the search results may include users or concepts the first user is not directly connected to, but which the first user may be interested in because the first user's friends (or friends-of-friend, etc.) are connected to these recommended users or concepts. For example, in response to the recommendation query "Books I should read", social-networking system 160 may generate search results corresponding to books "liked" by the querying user's friends, subtract out books already "liked" by the querying user, and send the remaining search results to the querying user, which may represent books the querying user may be interested in but has not yet "liked". In this way, the first user can search for things the user's friends "like" (or are otherwise connected to in social graph 200), while excluding redundant search results of things the first user already "likes" (or is otherwise already connected to in social graph 200). Although this disclosure describes generating recommendation queries in a particular manner, this disclosure contemplates generating recommendation queries in any suitable manner.

In particular embodiments, social-networking system 160 may send one or more structured queries to the querying user. The structured queries may be displayed on a page currently accessed by the first user. As an example and not by way of limitation, the page may be a profile page of the online social network (e.g., a user-profile page of the querying user or another user, or a concept-profile page of a concept associated with the online social network), a newsfeed page of the online social network, a search-results page corresponding to a particular structured query, or another suitable page of the online social network. In particular embodiments, each sent structured query may have a score greater than a threshold score to the querying user. After scoring the structured queries, the social-networking system 160 may then send only those structured queries having a score greater than a threshold score. As an example and not by way of limitation, when a user selects or inputs into a query field 350, social-networking system 160 may send the top-seven scoring structured queries for display in a drop-down menu 300, as illustrated in FIGS. 7A-7B, or may only send the top-six scoring structured queries for display, as illustrated in FIG. 7C. In particular embodiments, the sent structured queries may be displayed on a newsfeed page of the online social network. Queries having greater than a threshold score may automatically be pushed to a user. As an example and not by way of limitation, the sent structured queries may be displayed as one or more stories in the newsfeed of the querying user as a suggested query separate from query field 350. The structured queries could be generated and scored, as described previously, and rather than displaying the structured query in association with a query field 350, the structured query could be generated as a newsfeed store and displayed in a user's newsfeed in response to the user accessing a newsfeed page of the online social network. Although this disclosure describes sending structured queries in a particular manner, this disclosure contemplates sending structured queries in any suitable manner.

Figure 8:
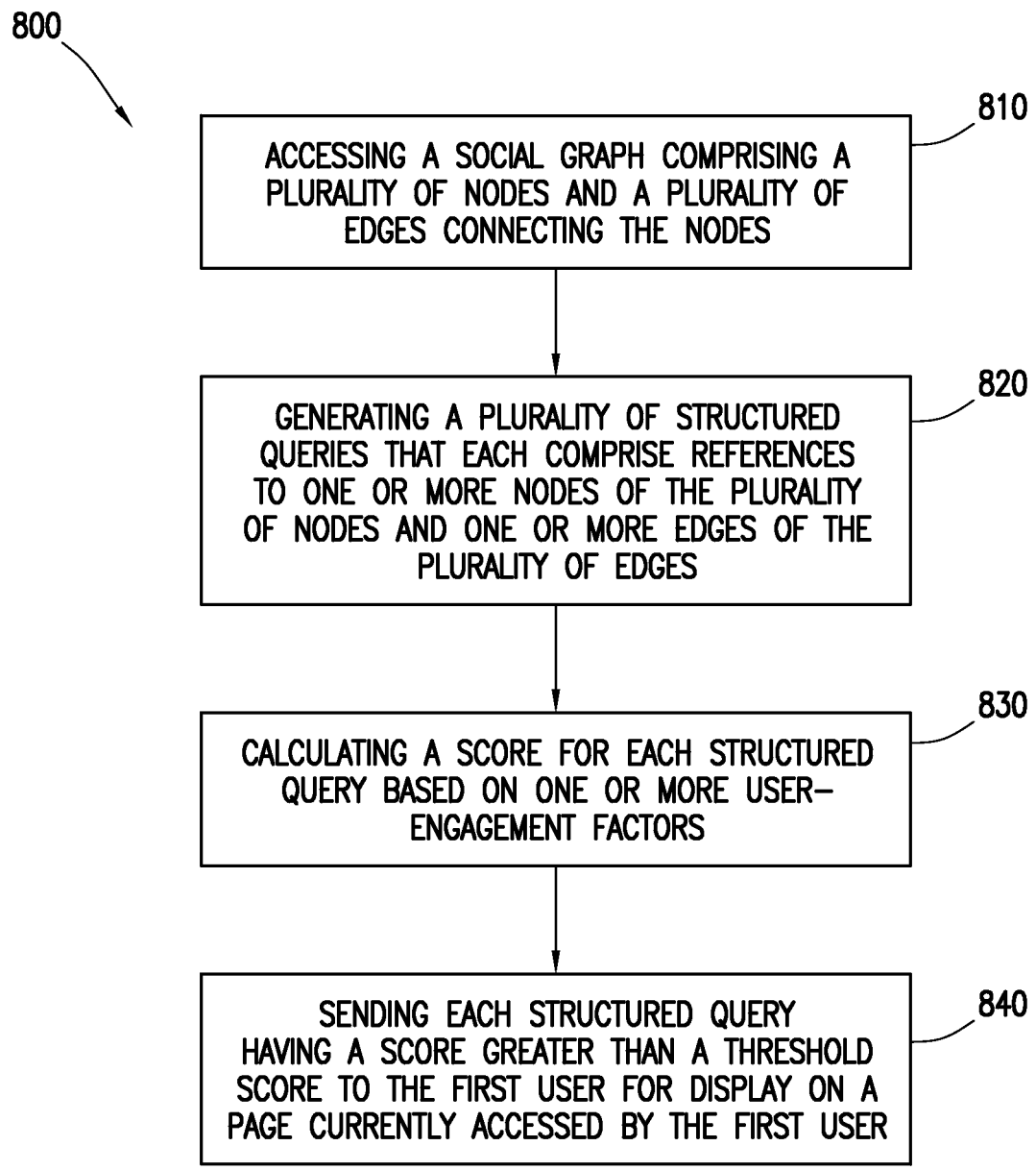
FIG. 8 illustrates an example method for generating default structured search queries for a user.

FIG. 8 illustrates an example method 800 for generating default structured search queries for a user. The method may begin at step 810, where the social-networking system 160 may access a social graph 200 comprising a plurality of nodes and a plurality of edges 206 connecting the nodes. The nodes may comprise a first user node 202 and a plurality of second nodes (one or more user nodes 202, concepts nodes 204, or any combination thereof). At step 820, social-networking system 160 may generate a plurality of structured queries that each comprise references to one or more nodes of the plurality of nodes and one or more edges of the plurality of edges. At step 830, social-networking system 160 may calculate a score for each structured query based on one or more user-engagement factors. Any suitable user-engagement factors may be used to calculate the score. At step 840, social-networking system 160 may send each structured query having a score greater than a threshold score to a first user for display on a page currently accessed by the first user. Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for generating default structured search queries for a user including the particular steps of the method of FIG. 8, this disclosure contemplates any suitable method for generating default structured search queries for a user including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Sponsored Default Queries

In particular embodiments, social-networking system 160 may generate sponsored queries for a user. A particular advertiser may identify a company, brand, product, event, person, or other thing that the advertiser is associated with or wants to sponsor. Social-networking system 160 may then identify social-graph elements corresponding to the thing the advertiser wants to sponsor and generate one or more structured queries referencing the identified social-graph elements. As an example and not by way of limitation, FIG. 7A illustrates example default queries of the online social network that include a sponsored query. In this example, an advertiser associated with the application "Online Poker" may want to sponsor queries referencing the application. In response to receiving an indication the advertiser wants to sponsor queries referencing "Online Poker", social-networking system 160 may identify the concept node 204 corresponding to the "Online Poker" application. Social-networking system 160 may then generate one or more sponsored queries referencing the identified social-graph element. As an example and not by way of limitation, social-networking system 160 may generate a sponsored query "My friends who play Online Poker", where the reference to "Online Poker" is a reference to the concept node 204 corresponding to the application "Online Poker." These sponsored queries may then be sent to the querying user and displayed on a page accessed by the user. Although this disclosure describes generating sponsored queries for a user in a particular manner, this disclosure contemplates generating sponsored queries for a user in any suitable manner.

In particular embodiments, social-networking system 160 may identify a node of the plurality of nodes corresponding to an advertiser. The identified node may correspond to a particular profile page for a company, brand, product, event, person, or other thing that the advertiser is associated with or wants to sponsor. Social-networking system 160 may also identify relevant edges 206 or edge-types connected to the identified node, such that the edges 206 or edge-types may be referenced in any generated sponsored queries. In particular embodiments, social-networking system 160 may receive from the advertiser an indication that the advertiser wants to sponsor one or more structured queries. The indication may identify one or more nodes of the plurality of nodes that correspond to the advertiser. As an example and not by way of limitation, an advertiser associated with the application "Online Poker" may want to sponsor one or more structured queries for the application. In response, social-networking system 160 may then identify the concept node 204 corresponding to the application "Online Poker", illustrated in FIG. 2. As another example and not by way of limitation, an advertiser may not want to directly advertise its company, brand, product, etc., and may instead want to indirectly sponsor a structured query. Continuing with the prior example, the advertiser associated with the application "Online Poker" may want to indirectly sponsor one or more structured queries for the application, for example, by identifying users who play the application and sponsoring queries for those users. In response, social-networking system 160 may identify friends of the querying user who play "Online Poker", such as User "F", as illustrated in FIG. 2, and may then generate a sponsored query such as "Games played by User F", which should generate a search results for "Online Poker". In this way, the advertiser may indirectly sponsor queries for its company, brand, product, etc. In particular embodiments, social-networking system 160 may provide a user interface to the advertiser that allows the advertiser to select which structured queries to sponsor. As an example and not by way of limitation, social-networking system 160 may provide a user interface to the advertiser, wherein the user interface displays one or more structured queries available for the advertiser to sponsor. For example, an interface similar to the interface displayed in FIG. 7A may be provided to the advertiser, where a plurality of structured queries are displayed and where the advertiser may simply select or click on a particular structured query to sponsor it (or may select or click on some type of separate activatable link, such as a button indicating "Sponsor this query!", providing similar functionality). Social-networking system 160 may then receive a selection from the advertiser identifying one or more of the structured queries available for the advertiser to sponsor. These selected queries may then be provided to one or more users as sponsored queries. Although this disclosure describes identifying particular objects of the online social network as corresponding to advertisers in a particular manner, this disclosure contemplates identifying any suitable objects of the online social network as corresponding to advertisers in any suitable manner.

In particular embodiments, social-networking system 160 may generate a plurality of structured queries that each comprise references to one or more nodes of the plurality of nodes and one or more edges of the plurality of edges. At least one of the structured queries may be a sponsored query comprising a reference to the identified node and one or more edges of the plurality of edges that are connected to the identified node. As an example and not by way of limitation, referencing FIG. 7A, social-networking system 160 may generate a plurality of structured queries as illustrated, where the suggested queries "My friends who went to Shawshank Redemption" and "My friends who play Online Poker" are sponsored queries, and indicated as such. The references to "Shawshank Redemption" and "Online Poker" are references to particular concept nodes 204 of social graph 200 corresponding to the movie "Shawshank Redemption" and the game "Online Poker", respectively. Similarly, the references to "my friends", "went to", and "who play" are references to friend-type, watched-type, and played-type edges 206 of social graph 200, respectively. In this example, a sponsor associated with "Shawshank Redemption" and "Online Poker" has sponsored these queries, such that they have been generated and provided to the querying user as suggested queries. Although this disclosure describes generating particular sponsored queries in a particular manner, this disclosure contemplates generating any suitable sponsored queries in any suitable manner.

In particular embodiments, social-networking system 160 may send one or more of the generated structured queries to the first user. At least one of the sent structured queries may be a sponsored query. As an example and not by way of limitation, social-networking system 160 may send a plurality of structured queries, as illustrated in FIG. 7A, and one of the structured queries may be the sponsored query "My friends who went to Shawshank Redemption", which may be sponsored by an advertiser associated with the movie. In particular embodiments, a sponsored query may include an indication that they are sponsored. As an example and not by way of limitation, referencing FIG. 7A, social-networking system 160 may generate the sponsored query "My friends who play Online Poker" and then include the text "(sponsored)" after the query to indicate that it is a sponsored query. The sponsored queries may be displayed on a page currently accessed by the first user. As an example and not by way of limitation, the page may be a profile page of the online social network (e.g., a user-profile page of the querying user or another user, or a concept-profile page of a concept associated with the online social network), a newsfeed page of the online social network, a search-results page corresponding to a particular structured query, a notifications page (e.g., a page displaying notifications, messages, emails, texts, or other communications associated with the online social network), a user interface of a native application associated with the online network, or another suitable page of the online social network. Although this disclosure describes sending particular sponsored queries in a particular manner, this disclosure contemplates sending any suitable sponsored queries in any suitable manner.

Figure 9:
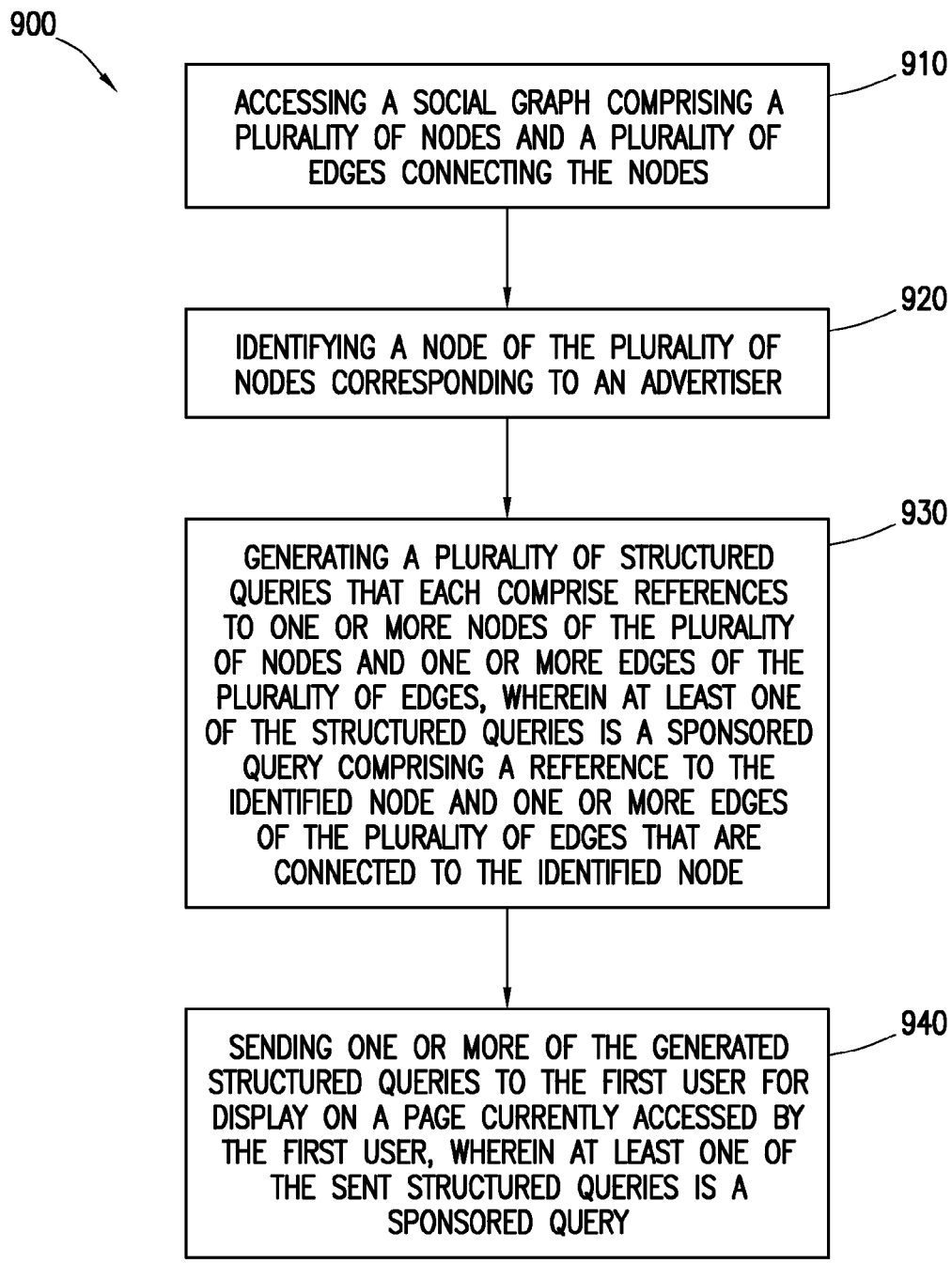
FIG. 9 illustrates an example method for generating sponsored structured queries for a user.

FIG. 9 illustrates an example method 900 for generating sponsored structured queries for a user. The method may begin at step 910, where the social-networking system 160 may access a social graph 200 comprising a plurality of nodes and a plurality of edges 206 connecting the nodes. The nodes may comprise a first user node 202 and a plurality of second nodes (one or more user nodes 202, concepts nodes 204, or any combination thereof). At step 920, social-networking system 160 may identify a node of the plurality of nodes corresponding to an advertiser. At step 930, social-networking system 160 may generate a plurality of structured queries that each comprise references to one or more nodes of the plurality of nodes and one or more edges of the plurality of edges. At least one of the structured queries may be a sponsored query comprising a reference to the identified node and one or more edges of the plurality of edges that are connected to the identified node. At step 940, social-networking system 160 may send one or more of the generated structured queries to a first user for display on a page currently accessed by the first user. At least one of the sent structured queries may be a sponsored query. Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for generating sponsored structured queries for a user including the particular steps of the method of FIG. 9, this disclosure contemplates any suitable method for generating sponsored structured queries for a user including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Dynamic Structured Search Queries

Figure 10A:
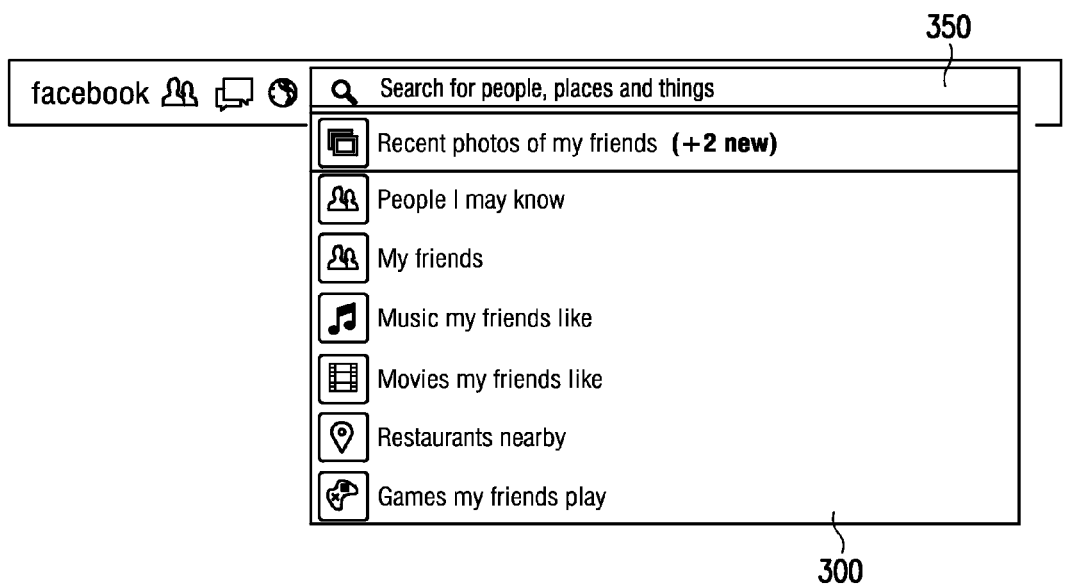
FIGS. 10A-10B illustrate example default queries and example search results of the online social network.
Figure 10B:
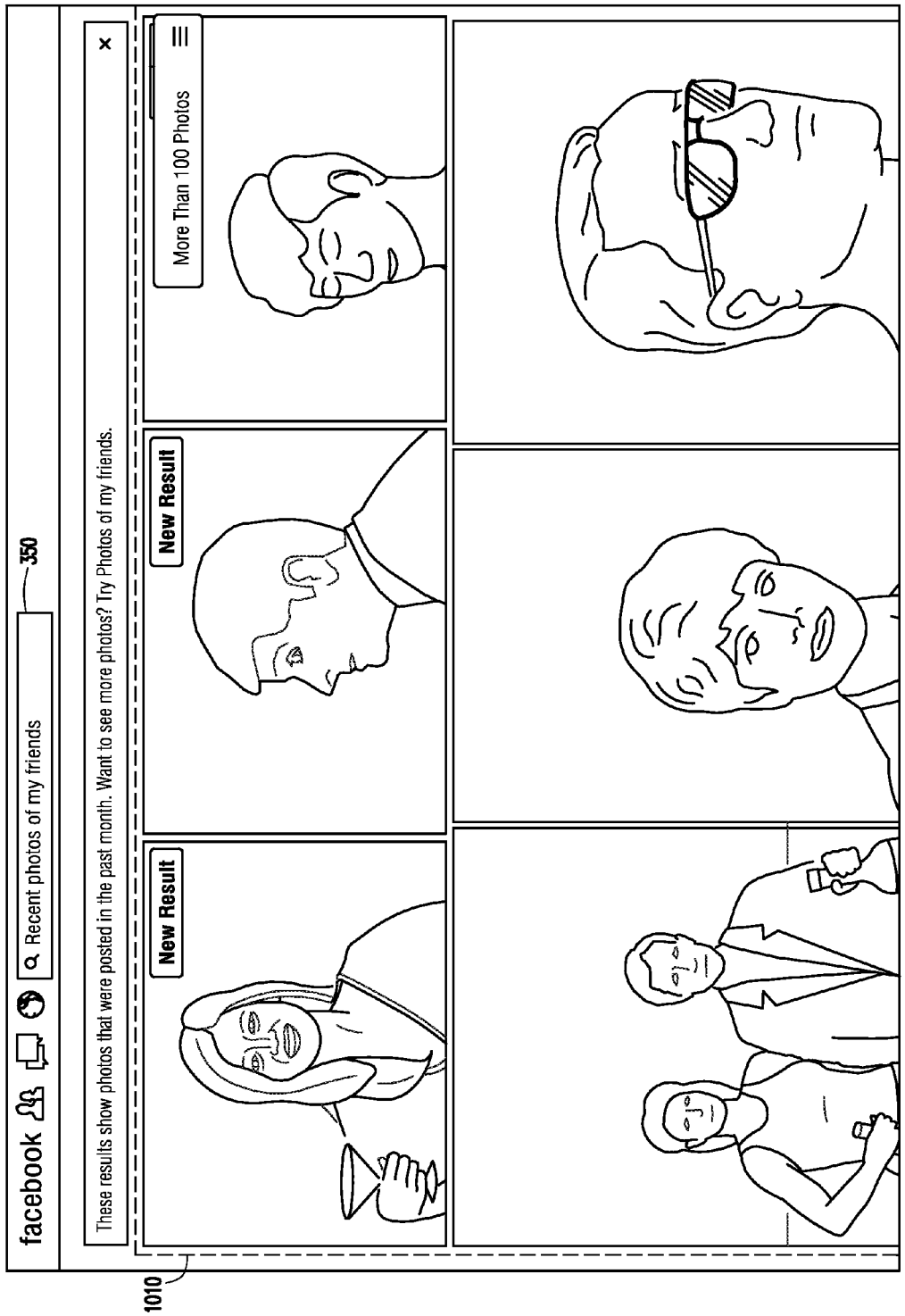

FIGS. 10A-10B illustrate example default queries and example search results of the online social network. In particular embodiments, social-networking system 160 may generate dynamic queries for a user. A dynamic query is a type of structured query that references additions, changes, or other updates to objects associated with the online social network. Dynamic queries may relate to trending activity or trending queries by other users on the online social network, such as, for example, "Posts by my friends about [news story from yesterday]" or "Photos of my friend in [location where the querying user just visited]". Dynamic queries may also be related to recent/timely content. As an example and not by way of limitation, FIG. 10A illustrates example default queries, where the structured query "Recent photos of my friends (+2)" is a dynamic query referencing recently added content to the online social network, where the reference to "(+2)" indicates the number of new photos that the query will produce. Similarly, the dynamic queries may relate to changes to search results, either over time or since the query was last run. For example, if a user previously searched for "Single girls in Palo Alto", later the user may be provided with the structured query "Single girls in Palo Alto (+2)", where the reference to "(+2)" indicates the change in the search results for the query since the user last ran the search. Dynamic queries may provide an elegant way for users of the online social network to see that particular updates have occurred or are occurring on the online social network without having to actually run a particular search query. Although this disclosure describes generating dynamic queries for a user in a particular manner, this disclosure contemplates dynamic queries for a user in any suitable manner.

In particular embodiments, social-networking system 160 may generate a plurality of structured queries that each comprise references to one or more nodes of the plurality of nodes and one or more edges of the plurality of edges. At least one of the structured queries may be a dynamic query comprising a reference one or more updates to the social graph. The updates referenced in a dynamic query may be additions, changes, or other suitable updates to objects associated with the online social network. The particular update may be referenced in the dynamic query. In particular embodiments, the one or more updates to social graph 200 may comprise updates within a threshold period of time. As an example and not by way of limitation, referencing FIG. 10A, social-networking system 160 may generate a plurality of structured queries, as illustrated, one of which is the dynamic query "Recent photos of my friends (+2 new)" where the reference to "(+2 new)" is a reference to updates to social graph 200. In this case, the "(+2 new)" may indicate that two new photos of friends of the querying user have been added to the online social network (each photo corresponding to a newly added concept node 204 of social graph 200) within a threshold period of time. In particular embodiments, the one or more updates to social graph 200 may comprise updates since a particular structured query was last selected by the first user. As an example and not by way of limitation, again referencing FIG. 10A, in the dynamic query "Recent photos of my friends (+2 new)", the reference to "(+2 new)" may instead indicate that two new photos of friends of the querying user have been added to the online social network since the last time the querying user ran the query "Recent photos of my friends". In particular embodiments, the one or more updates to social graph 200 may comprise updates performed by one or more users within a threshold degree of separation of the querying user. The threshold degree of separation may be, for example, one, two, three, or all. As an example and not by way of limitation, social-networking system 160 may generate dynamic queries referencing updates by the querying user's friends (e.g., new photos by the user's friends). As another example and not by way of limitation, social-networking system 160 may generate dynamic queries referencing global updates (e.g., globally trending topics in posts). Although this disclosure describes generating particular dynamic queries in a particular manner, this disclosure contemplates generating any suitable dynamic queries in any suitable manner.

In particular embodiments, social-networking system 160 may generate dynamic queries referencing a variety of updates to the online social network. Any suitable updates to social graph 200 may be referenced. In particular embodiments, the updates to social graph 200 may comprise trending activity on the online social network. Trends may be measure with respect to users within a threshold degree of separation, and may be measured with respect to activity over any suitable time period. In particular embodiments, the updates to social graph 200 may comprise trending queries of the online social network. The trending queries may comprise references to one or more nodes of the plurality of nodes previously searched for by one or more users of the online social network. As an example and not by way of limitation, social-networking system 160 may generate a particular structured query for the querying user (e.g., "Photos taken at The Old Pro", as illustrated in FIG. 7B) because other users of the online social network (e.g., the querying user's friends) have run that particular structured query. In particular embodiments, the updates to social graph 200 may comprise adding one or more concept nodes 204 to social graph 200 corresponding to one or more content objects added to the online social network, respectively. In this case, the dynamic queries may comprise a reference to the concept nodes added to social graph 200. The content object added to the online social network may be any suitable content object, such as, for example, multimedia objects, posts, or other suitable objects associated with the online social network. As an example and not by way of limitation, continuing with the example illustrated in FIG. 7B, social-networking system 160 may determine that references to the actor "Ben Affleck" are trending in posts on the online social network by friends of the querying user. Referencing these updates, social-networking system 160 may then generate a dynamic query "My friends posts about Ben Affleck (+18)", where the reference to "(+18)" indicates that eighteen posts have been made by the querying user's friends about "Ben Affleck". In this example, the one or more updates to social graph 200 may comprise trending topics or keywords associated with the posts (e.g., the term "Ben Affleck"). In particular embodiments, the updates to social graph 200 may comprise updates to one or more edges connecting one or more nodes. Edges 206 may be added, deleted, or changed within social graph 200 in response to activity by users of the online social network. As an example and not by way of limitation, social-networking system 160 may generate a dynamic query "Newly single girls in Palo Alto (+2 new)", where the reference to "(+2 new)" indicates that two female users who live in the city Palo Alto have changed their relationship status from "in a relationship" to "single", thus changing the edge-type indicating their relationship status from an in-a-relationship-type to a single-type edge 206. As another example and not by way of limitation, social-networking system 160 may generate a dynamic query "Friends who have check-in at the Old Pro (+3)", where the reference to "(+3)" indicates that two friends of the querying user have "checked-in" at the location "Old Pro", where checking-in creates a check-in-type edge 206 between the user nodes 202 corresponding to those users and the concept node 204 for the location "Old Pro". Although this disclosure describes generating dynamic queries referencing particular updates, this disclosure contemplates generating dynamic queries referencing any suitable updates.

In particular embodiments, social-networking system 160 may generate structured queries referencing changes in search results. When generating particular structured queries, social-networking system 160 may also identify the search results corresponding to the structured queries prior to the user selecting any query in order to determine if any of the search results have changed. In the case that search results have change, for example, because there are new objects that now match the search criteria of the structured query, then social-networking system 160 may generate a dynamic query referencing the change in search results. As an example and not by way of limitation, referencing FIG. 10A, social-networking system 160 may generate the dynamic query "Recent photos of my friends (+2 new)", which indicates that the search results corresponding to the structured query includes two new results. The querying user may then select this structured query, and social-networking system 160 may generate a search-results page, where the search results 1010 include two results marked as "New Results", which represent the new search results referenced by the dynamic query. Social-networking system 160 may generate structured queries referencing changes in search results in any suitable manner. As an example and not by way of limitation, social-networking system 160 may access a prior structured query previously selected by the first user (e.g., "Recent photos of my friends"). Social-networking system 160 may then identify changes to the search results corresponding to the prior structured query (e.g., identifying two new results). The identified changes to the search results may be changes within a threshold period of time, or changes since the prior structured query was last selected by the first user. Social-networking system 160 may then generate one or more dynamic queries, wherein at least one of the dynamic queries comprises the prior structured and references to the identified changes to the search results corresponding to the prior structured query. Although this disclosure describes generating structured queries referencing changes in search results in a particular manner, this disclosure contemplates generating structured queries referencing changes in search results in any suitable manner.

In particular embodiments, social-networking system 160 may send one or more of the generated structured queries to the first user. At least one of the sent structured queries may be a dynamic query. The dynamic query may be displayed with a reference indicating the particular updates to social graph 200 associated with the dynamic query. As an example and not by way of limitation, social-networking system 160 may send a plurality of structured queries, as illustrated in FIG. 10A, and one of the structured queries may be the dynamic query "Recent photos of my friends (+2 new)", which references newly added photos tagged with friends of the querying user. The dynamic queries may be displayed on a page currently accessed by the first user. As an example and not by way of limitation, the page may be a profile page of the online social network (e.g., a user-profile page of the querying user or another user, or a concept-profile page of a concept associated with the online social network), a newsfeed page of the online social network, a search-results page corresponding to a particular structured query, a notifications page (e.g., a page displaying notifications, messages, emails, texts, or other communications associated with the online social network), a user interface of a native application associated with the online network, or another suitable page of the online social network. Although this disclosure describes sending dynamic queries to users in a particular manner, this disclosure contemplates sending dynamic queries to users in any suitable manner.

Figure 11:
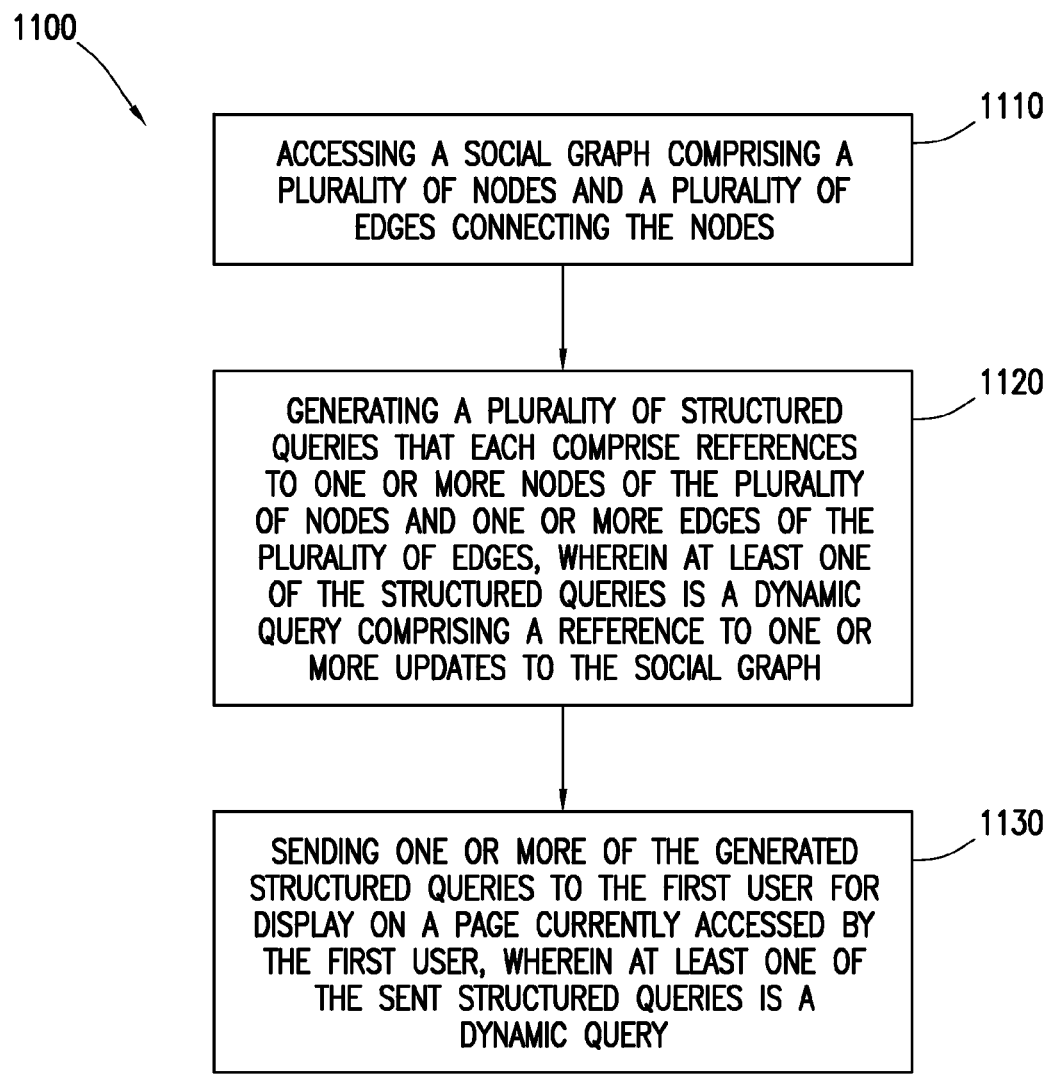
FIG. 11 illustrates an example method for generating dynamic structured queries for a user.

FIG. 11 illustrates an example method 1100 for generating dynamic structured queries for a user. The method may begin at step 1110, where the social-networking system 160 may access a social graph 200 comprising a plurality of nodes and a plurality of edges 206 connecting the nodes. The nodes may comprise a first user node 202 and a plurality of second nodes (one or more user nodes 202, concepts nodes 204, or any combination thereof). At step 1120, social-networking system 160 may generate a plurality of structured queries that each comprise references to one or more nodes of the plurality of nodes and one or more edges of the plurality of edges. At least one of the structured queries may be a dynamic query comprising a reference one or more updates to the social graph. Any suitable updates to the social graph may be referenced. At step 1130, social-networking system 160 may send one or more of the generated structured queries to a first user for display on a page currently accessed by the first user. At least one of the sent structured queries may be a dynamic query. Particular embodiments may repeat one or more steps of the method of FIG. 11, where appropriate. Although this disclosure describes and illustrates particular steps of the method of FIG. 11 as occurring in a particular order, this disclosure contemplates any suitable steps of the method of FIG. 11 occurring in any suitable order. Moreover, although this disclosure describes and illustrates an example method for generating dynamic structured queries for a user including the particular steps of the method of FIG. 11, this disclosure contemplates any suitable method for generating dynamic structured queries for a user including any suitable steps, which may include all, some, or none of the steps of the method of FIG. 11, where appropriate. Furthermore, although this disclosure describes and illustrates particular components, devices, or systems carrying out particular steps of the method of FIG. 11, this disclosure contemplates any suitable combination of any suitable components, devices, or systems carrying out any suitable steps of the method of FIG. 11.

Generating Search Results

Figure 12B:
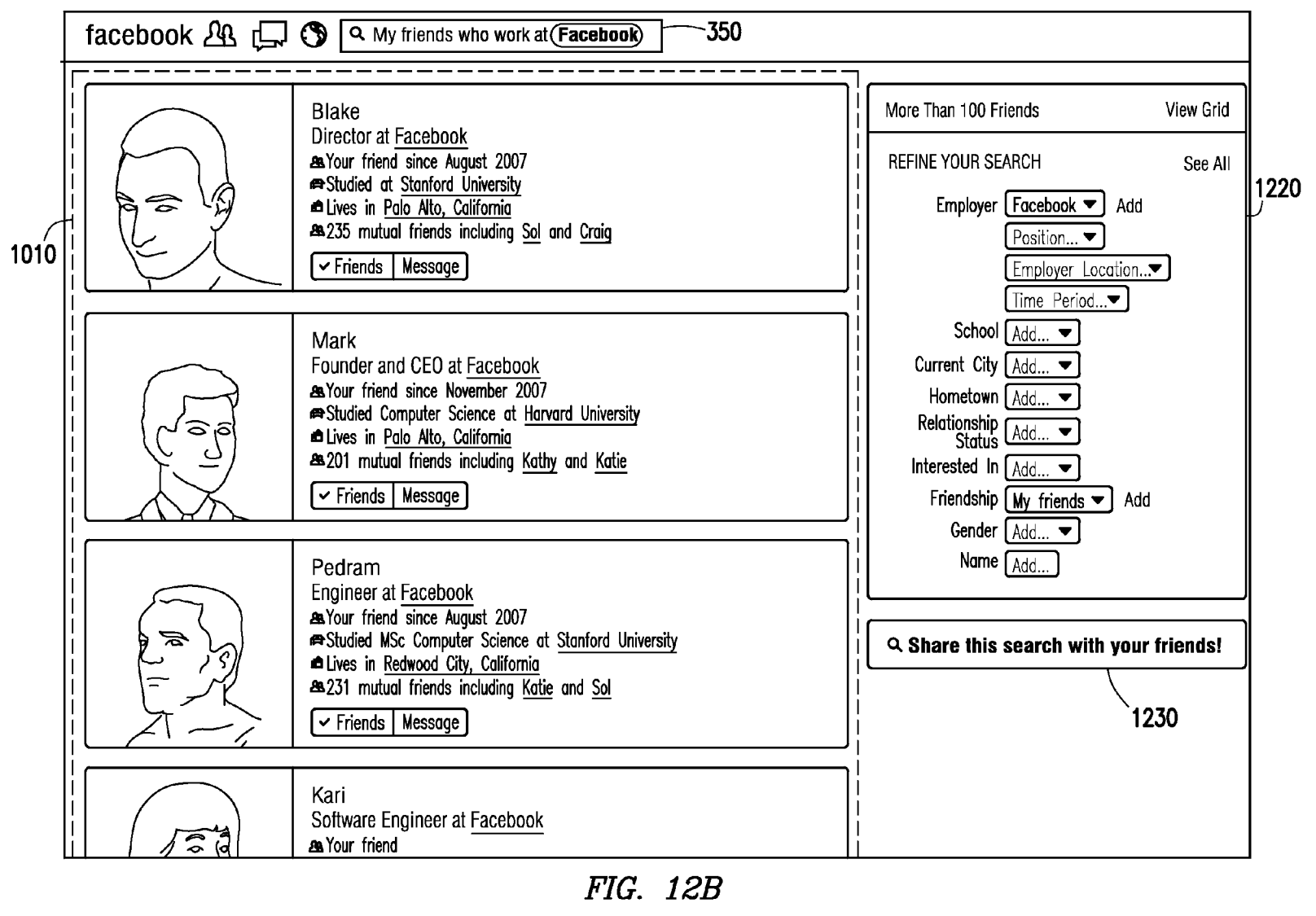

In particular embodiments, in response to a structured query received from a querying user, the social-networking system 160 may generate one or more search results, where each search result matches (or substantially matches) the terms of the structured query (which includes sponsored queries, dynamic queries, and other types of structured queries). The social-networking system 160 may receive a structured query from a querying user (also referred to as the "first user", corresponding to a first user node 202). In response to the structured query, the social-networking system 160 may generate one or more search results corresponding to the structured query. Each search result may include link to a profile page and a description or summary of the profile page (or the node corresponding to that page). The search results may be presented and sent to the querying user as a search-results page. FIGS. 10B and 12B illustrate example search-results pages generated in response to particular structured queries. The structured query used to generate a particular search-results page may be shown in query field 350, and the various search results generated in response to the structured query are illustrated in a results field 1010 for presented search results. In particular embodiments, the query field 350 may also serve as the title bar for the page. In other words, the title bar and query field 350 may effectively be a unified field on the search-results page. As an example, FIG. 12B illustrates a search-results page with the structured query "My friends who work at Facebook" in query field 350. This structured query also effectively serves as the title for the generated page, where the page shows a plurality search results of users of the online social network who are employees at the company "Facebook". The search-results page may also include a field for modifying search results (e.g., field 1220 in FIG. 12B) and a field for sharing structured queries and search results (e.g., field 1230 in FIG. 12B). When generating the search results, the social-networking system 160 may generate one or more snippets for each search result, where the snippets are contextual information about the target of the search result (i.e., contextual information about the social-graph entity, profile page, or other content corresponding to the particular search result). Although this disclosure describes and illustrates particular search-results pages, this disclosure contemplates any suitable search-results pages.

In particular embodiments, the social-networking system 160 may generate one or more search results corresponding to a structured query. The search results may identify resources or content (e.g., user-profile pages, content-profile pages, or external resources) that match or are likely to be related to the search query. In particular embodiments, each search result may correspond to a particular user node 202 or concept node 204 of the social graph 200. The search result may include a link to the profile page associated with the node, as well as contextual information about the node (i.e., contextual information about the user or concept that corresponds to the node). As an example and not by way of limitation, referencing 12B, the structured query "My friends who work at Facebook" in query field 350 generated the various search results illustrated in results field 1010. Each search result in results field 1010 shows a link to a profile page of a user (illustrated as the user's name, which contains an inline link to the profile page) and contextual information about that user that corresponds to a user node 202 of the social graph 200. As another example and not by way of limitation, referencing FIG. 10B, the structured query "Recent photos of my friends" in query field 350 generated the various search results illustrated in results field 1010. Each search result illustrated in FIG. 10B shows a thumbnail of a photograph that corresponds to a concept node 204 of the social graph. In particular embodiments, each search result may correspond to a node that is connected to one or more of the selected nodes by one or more of the selected edges of the structured query. In particular embodiments, the social-networking system 160 may also transmit advertisements or other sponsored content to the client system 130 in response to the structured query. The advertisements may be included in as part of the search results, or separately. The advertisements may correspond to one or more of the objects referenced in the search results. In particular embodiments, the social-networking system 160 may filter out one or more search results identifying particular resources or content based on the privacy settings associated with the users associated with those resources or content. Although this disclosure describes generating particular search results in a particular manner, this disclosure contemplates generating any suitable search results in any suitable manner.

More information on generating search results may be found in U.S. patent application Ser. No. 13/556,017, filed 23 Jul. 2012, and U.S. patent application Ser. No. 13/731,939, filed 31 Dec. 2012, each of which is incorporated by reference.

Sharing Structured Search Queries

Figure 12C:
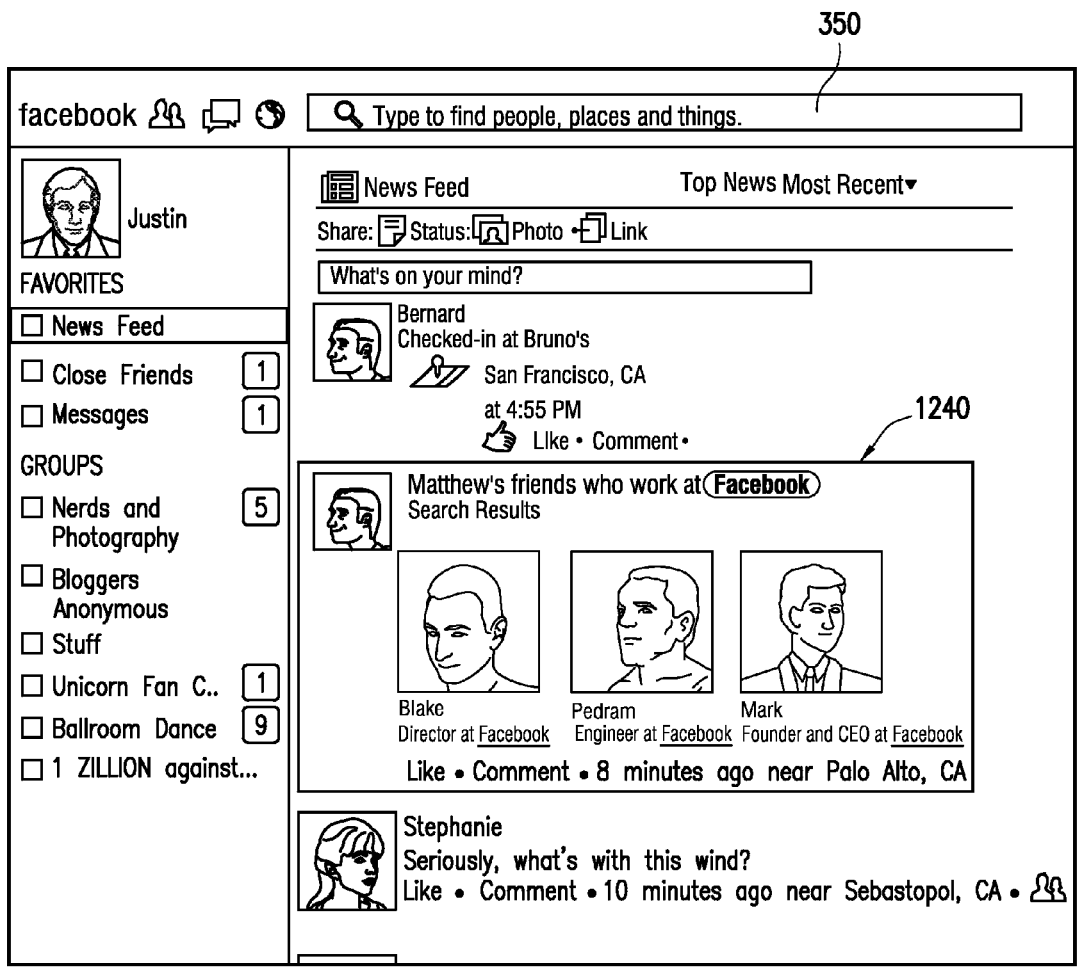

FIGS. 12A-12C illustrate example pages of an online social network. In particular embodiments, social-networking system 160 may allow users to share structured queries and search results with other users of the online social network. Users of the online social network may want to share structured queries and their corresponding search results with other users of the online social network, allowing those users to view the query and/or search results. Social-networking system 160 may receive a selection from a first user of a structured query that the first user wants to share with one or more second users of the online social network. Structured queries and search results may be shared with any suitable users of the online social network, such as, for example, users within a threshold degree of separation of the first user, particular groups or networks, or publically. Social-networking system 160 may then send the selected structured query to one or more second users. As an example and not by way of limitation, a first user may select a particular structured query, such as "My friends who work at Facebook", as illustrated in the FIG. 12A, which illustrated the newsfeed page of the user "Matthew". Social-networking system 160 may then generate search results corresponding to that structured query, as illustrated in FIG. 12B. The search-results page may include an activatable link allowing the first user to share the structured query and/or search results directly from the search-results page, such as the "Share this search with your friends!" link illustrated in field 1230. The first user may select this link, and in response social-networking system 160 may share the structured query and one or more of the search results by displaying them a page of a second user, such as the second user's newsfeed page as illustrated in FIG. 12C, which illustrates the newsfeed page of the user "Justin". The second user may then select the shared query, which may then be executed by social-networking system 160 for the second user. Although this disclosure describes sharing structured queries in a particular manner, this disclosure contemplates sharing structured queries in any suitable manner.

In particular embodiments, social-networking system 160 may receive from a first user a selection of a structured query the first user wants to share with one or more second users of the plurality of users. Users may want to share queries or results that are interesting or that other users may want to view or otherwise engage with. The selection may indicate whether the user wants to share the query, the search results, or both, and may indicate which users to share with (e.g., particular users, friends, friends-of-friends, publically, etc.). As an example and not by way of limitation, if a first user runs a particular structured query, such as "Friends of Mark", social-networking system 160 may generate a search-results page corresponding to this query. The first user may then be able to share this query by copying the URL corresponding to the search-results page (e.g., https://www.facebook.com/search/[Mark]/photos-of) and posting it as a story on the user's profile page, which may then be shared as a story in the newsfeed of other users of the online social network. In particular embodiments, a first user may share a query and/or search results directly from a search-results page. The search-results page may include a field allowing the first user to indicate the user wants to share the structured query, the corresponding search results, or both, as appropriate. As an example and not by way of limitation, social-networking system 160 may send a search-results page to the first user, where the search-results page may comprise one or more search results corresponding to a selected structured query. The search-results page may also comprise an activatable link enabling the first user to share the query and/or search results with the one or more second users. For example, referencing FIG. 12B, the search-results page may include an activatable link such as the "Share this search with your friends!" link illustrated in field 1230. The first user may click or otherwise activate this link, and social-networking system 160 may receive the indication the first user has activated the activatable link on the search-results page in order to share the structured query and/or the search results. In particular embodiments, a first user may share a query directly from a query field. As an example and not by way of limitation, social-networking system 160 may send one or more structured queries to a first user, which may be displayed in a drop-down menu 300 associated with a query field 350. One or more of the structured queries may be displayed with an activatable link with the structured query, such as a "Share this query!" button next to the query, which could be clicked or otherwise selected directly from drop-down menu 300, allowing the user to run the query, share the query, share the search results, or any combination thereof. Although this disclosure describes users sharing structured queries in a particular manner, this disclosure contemplates users sharing structured queries in any suitable manner.

In particular embodiments, in response to receiving a selection of a structured query the first user wants to share, social-networking system 160 may send the structured query for display on a page associated with one or more second users. In the case where search results are shared, the search results may be generated with respect to the first user or with respect to the second user. The shared structured query (and/or search results) may be displayed on a page currently accessed by the second user. As an example and not by way of limitation, the page may be a profile page of the online social network (e.g., a user-profile page of the user, or a concept-profile page of a concept associated with the online social network), a newsfeed page of the online social network, a search-results page corresponding to a particular structured query, a notifications page (e.g., a page displaying notifications, messages, emails, texts, or other communications associated with the online social network), a user interface of a native application associated with the online network, or another suitable page of the online social network. In particular embodiments, the page may be a newsfeed page of the online social network, and the shared structured query and/or search results may be displayed as a story in a newsfeed. As an example and not by way of limitation, referencing FIG. 12C, social-networking system 160 may generate a newsfeed page as illustrated for the user "Justin" in response to the user "Matthew" sharing the search query "My friends who work as Facebook". The shared structured query and search results are displayed to the user "Justin" as a story in the user's newsfeed, as illustrated in field 1240. In particular embodiments, the page may be a profile page of the online social network corresponding to the second user. As an example and not by way of limitation, similar to the example illustrated in FIG. 12C, the first user may share the structured query and/or search results by posting a link as a post on the profile page of a second user, and the shared structured query and/or search results may then be displayed as a post on the second user's profile page. In particular embodiments, the page may be a search-results page corresponding to a particular structured query. The structured query may comprise references to one or more nodes and one or more edges, and the search-results page may have been generated in response to this structured query. As an example and not by way of limitation, the shared structured query and/or search results may be displayed on a search-results page accessed by the second user as a suggested query. Although this disclosure describes sending shared structured queries in a particular manner, this disclosure contemplates sending shared structured queries in any suitable manner.

In particular embodiments, social-networking system 160 may receive a selection of a shared structured query from a second user. In response to receiving a shared structured query from a first user, the second user may select the shared structured query. Social-networking system 160 may then generate one or more search results corresponding to the shared query and send the search results to the second user (e.g., as a search-results page). The search results may be generated with respect to the sharing/first user, or with respect the receiving/second user. As an example and not by way of limitation, in response to the user "Justin" clicking on the structured query "My friends who work at Facebook" shared by the user "Matthew" in FIG. 12C, social-networking system 160 may generate one or more search results with respect to the user "Matthew". In other words, when the user "Justin" selects the shared query, social-networking system 160 generates search results showing users who work at Facebook who are friends of the user "Matthew". The "my friends" constraint in the structured query is executed with respect to the first user ("Matthew") in this case, even though it is being run by the second user ("Justin"). Social-networking system 160 may generate search results corresponding to this structured query for the user "Justin" as if the structured query were executed by the user "Matthew", allowing the user "Justin" to see the same search results that the user "Matthew" would see. Alternatively, some search results may be filtered out based on the privacy settings associated with the users corresponding to the search results (for example, certain search results may be visible to the user "Matthew" but not visible to the user "Justin" based on privacy settings associated with the search result). As another example and not by way of limitation, in response to the user "Justin" clicking on the structured query "My friends who work at Facebook" shared by the user "Matthew" in FIG. 12C, social-networking system 160 may generate one or more search results with respect to the user "Justin". In other words, when the user "Justin" selects the shared query, social-networking system 160 generates search results showing users who work at Facebook who are friends of the user "Justin". The "my friends" constraint in the structured query is executed with respect to the second user ("Justin") in this case, even though it was shared by the first user ("Matthew"). Although this disclosure describes generating search results for a shared query in a particular manner, this disclosure contemplates generating search results for a shared query in any suitable manner.

Figure 13:
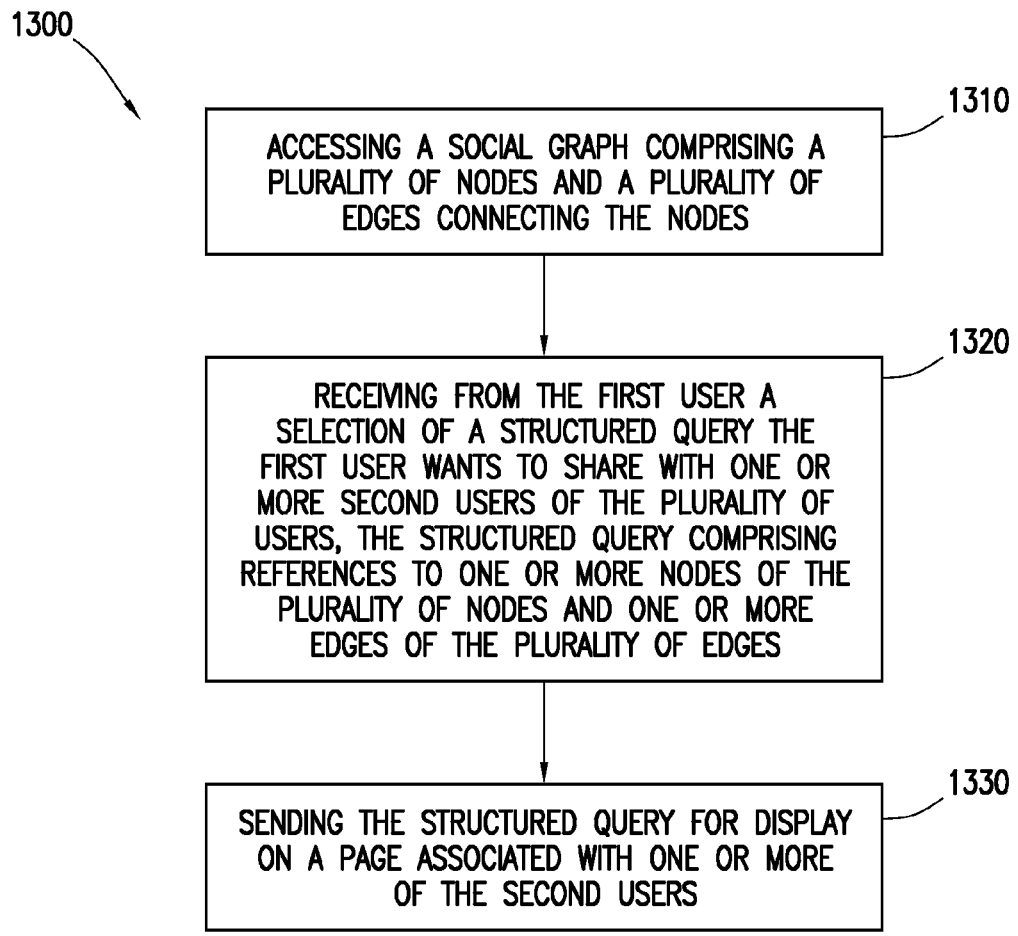
FIG. 13 illustrates an example method for sharing search queries on an online social network.

FIG. 13 illustrates an example method 1300 for sharing search queries on an online social network. The method may begin at step 1310, where the social-networking system 160 may access a social graph 200 comprising a plurality of nodes and a plurality of edges 206 connecting the nodes. The nodes may comprise a first user node 202 and a plurality of second nodes (one or more user nodes 202, concepts nodes 204, or any combination thereof). At step 1320, social-networking system 160 may receive from a first user a selection of a structured query the first user wants to share with one or more second users of the plurality of users. The structured query may comprise references to one or more nodes of the plurality of nodes and one or more edges of the plurality of edges. At step 1330, social-networking system 160 may send the structured query for display on a page associated with one or more of the second users. Particular embodiments may repeat one or more steps of the method of FIG. 13, where appropriate. Although this disclosure describes and illustrates particular steps of the method of FIG. 13 as occurring in a particular order, this disclosure contemplates any suitable steps of the method of FIG. 13 occurring in any suitable order. Moreover, although this disclosure describes and illustrates an example method for sharing search queries on an online social network including the particular steps of the method of FIG. 13, this disclosure contemplates any suitable method for sharing search queries on an online social network including any suitable steps, which may include all, some, or none of the steps of the method of FIG. 13, where appropriate. Furthermore, although this disclosure describes and illustrates particular components, devices, or systems carrying out particular steps of the method of FIG. 13, this disclosure contemplates any suitable combination of any suitable components, devices, or systems carrying out any suitable steps of the method of FIG. 13.

Structured Search Queries with Previews of Search Results

In particular embodiments, social-networking system 160 may generate structured queries that are displayed with previews of the search results corresponding to the queries. When a structured query is generated, as described previously, social-networking system 160 may also generate search results corresponding to one or more of the structured queries. The search results may be generated concurrently with the structured queries, or in response to a selection (e.g., mousing over) of one of the structured queries by the querying user. The structured queries and search results could then be sent to the querying user for display, where one or more of the queries could be displayed with a preview of the search results corresponding to the query. The preview could be displayed in any suitable manner. As an example and not by way of limitation, the querying user may mouse-over the structured query "My friends who work at Facebook", as illustrated in FIG. 12A, and a preview for that structured query may be generated and displayed just below the query, where the preview shows the names and thumbnail photos of some of the matching search results. Previews of search results may be displayed in association with any suitable type of query described herein. Furthermore, if a structured query is shared with other users, as described previously, the shared structured query may be displayed with a preview of the search results. As an example and not by way of limitation, for the shared structured query "Matthew's friends who work at Facebook", as illustrated in FIG. 12C, a preview of the search results for that shared query may be displayed in the newsfeed story along with the shared query. By generating previews to display with structured queries, social-networking system 160 may provide an a quick and convenient way for users of the online social network to review search results for a particular query without having to leave the current page accessed by the user since search results for multiple queries may be previewed from the query field. Although this disclosure describes generating structured queries with previews of search results in a particular manner, this disclosure contemplates generating structured queries with previews of search results in any suitable manner.

In particular embodiments, social-networking system 160 may generate a plurality of structured queries and generate one or more search results corresponding to at least one of the structured queries. The search results corresponding to each structured query may be generated concurrently with the structured queries, or may be generated in response to a selection of the structured query by the querying user. As an example and not by way of limitation, social-networking system 160 may generate a plurality of structured queries, and a plurality of sets of search results corresponding to each structured query, respectively. In this case, all of the structured queries and their corresponding search results may be generated concurrently. As another example and not by way of limitation, social-networking system 160 may generate a plurality of structured queries. Social-networking system 160 may then generate search results for one or more of the structured queries, for example, in response to the querying user mousing over on of the structured queries. Alternatively, the search results for a particular structured query may be generated before receiving a selection from the user, sent to the user's client system 130, and using a client-side process the search results may be retrieved (e.g., from a client-side cache) and displayed as a preview once the querying user mouses over the query. Although this disclosure describes generating structured queries and search results in a particular manner, this disclosure contemplates generating structured queries and search results in any suitable manner.

In particular embodiments, social-networking system 160 may send one or more of the structured queries for display to the first user. At least one of the structured queries may be displayed with a preview of one or more of the search results corresponding to the structured query. The preview may comprise some or all of the search results corresponding to the structured query, though typically the preview will only include a small sub-set of the total search results. Furthermore, the preview may be displayed in association with query field 300 (e.g., in drop-down menu 300, adjacent to the respective structured query, as illustrated in FIG. 12A), or in another suitable location (e.g., on a sidebar on the page, or as a pop-up overlay over the query as it is moused-over). Each search result may correspond to a particular node of social graph 200. Moreover, each search result of the preview may include a thumbnail image or one or more snippets of contextual information associated with the node corresponding to the search result. Furthermore, each search result of the preview may be associated with a particular profile page of the online social network, and each snippet may comprise information from the profile page associated with the search result. As an example and not by way of limitation, referencing FIG. 12A, in response to receiving the text query "friends who work at facebook" from the querying user, social-networking system 160 may generate a plurality of structured queries and send those queries for display in a drop-down menu 300 associated with query field 350. One of the structured queries may be "My friends who work at Facebook", as illustrated in field 1210. The structured query illustrated in field 1210 is displayed with a preview of some of the search results corresponding to the structured query "My friends who work at Facebook", where the name and thumbnail image of each search result is displayed in the preview. The structured queries with previews may be displayed on a page currently accessed by the first user. As an example and not by way of limitation, the page may be a profile page of the online social network (e.g., a user-profile page of the querying user or another user, or a concept-profile page of a concept associated with the online social network), a newsfeed page of the online social network, a search-results page corresponding to a particular structured query, a notifications page (e.g., a page displaying notifications, messages, emails, texts, or other communications associated with the online social network), a user interface of a native application associated with the online network, or another suitable page of the online social network. In particular embodiments, the querying user may share the structured query with the preview with one or more second users of the online social network. The search results may be generated with respect to the sharing/querying user, or with respect the receiving/second user. As an example and not by way of limitation, a first user may share the structured query "My friends who work at Facebook" and the corresponding search results, as illustrated in FIG. 12B, for example, by activating the link "Share this search with your friends!" in field 1230. In response, social-networking system 160 may generate a story that is displayed in the newsfeed of a second user, as illustrated in FIG. 12C. The shared structured query, "Matthew's friends who work at Facebook", is displayed with a preview of the search results corresponding to the query, as illustrated in field 1240. In this example, the search results in the preview illustrated in field 1240 are generated with respect to the first user ("Matthew"), though they could also be generated with respect to the second user ("Justin"). Although this disclosure describes generating previews for search queries in a particular manner, this disclosure contemplates generating previews for search queries in any suitable manner.

In particular embodiments, the structured queries with previews of search results may be sent in response to a selection by the querying user. Social-networking system 160 may receive from the first user a selection of one of the structured queries. As an example and not by way of limitation, the first user may click-on, touch, mouse-over, or otherwise provide an indication that a particular structured query is being selected. In response, social-networking system 160 may generate search results for at least the selected structured query. The preview of the search results may then be displayed with the selected structured query. The sent structured queries may be displayed in a drop-down menu 300 on the page, wherein the preview of the search results may be displayed in the drop-down menu 300 (e.g., below the respective structured query). Although this disclosure describes generating previews for search queries in a particular manner, this disclosure contemplates generating previews for search queries in any suitable manner.

Figure 14:
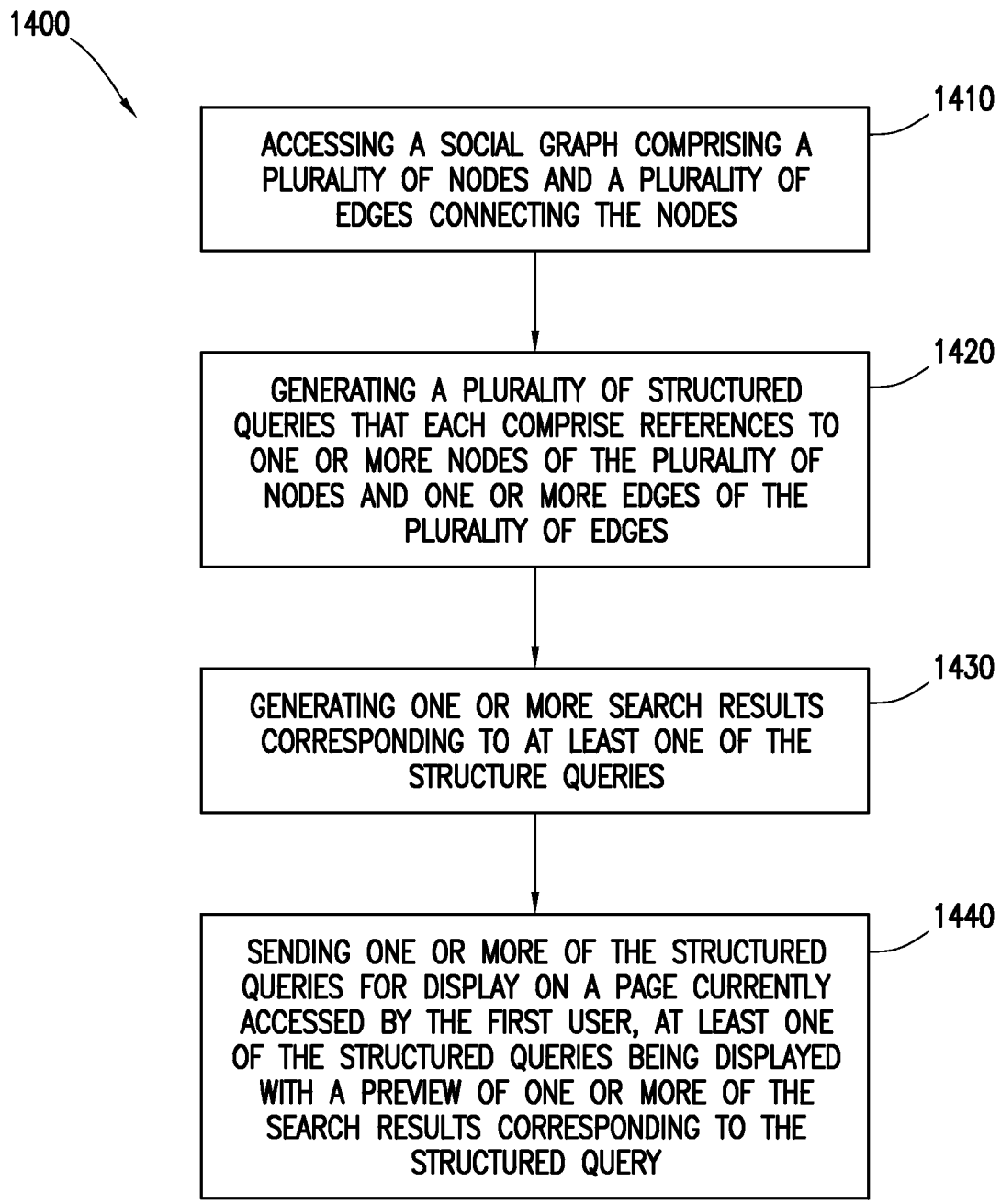
FIG. 14 illustrates an example method for generating search queries with previews of search results.

FIG. 14 illustrates an example method 1400 for generating search queries with previews of search results. The method may begin at step 1410, where the social-networking system 160 may access a social graph 200 comprising a plurality of nodes and a plurality of edges 206 connecting the nodes. The nodes may comprise a first user node 202 and a plurality of second nodes (one or more user nodes 202, concepts nodes 204, or any combination thereof). At step 1420, social-networking system 160 may generate a plurality of structured queries that each comprise references to one or more nodes of the plurality of nodes and one or more edges of the plurality of edges. At step 1430, social-networking system 160 may generate one or more search results corresponding to at least one of the structure queries. At step 1440, social-networking system 160 may send one or more of the structured queries for display on a page currently accessed by a first user. At least one of the structured queries may be displayed with a preview of one or more of the search results corresponding to the structured query. Particular embodiments may repeat one or more steps of the method of FIG. 14, where appropriate. Although this disclosure describes and illustrates particular steps of the method of FIG. 14 as occurring in a particular order, this disclosure contemplates any suitable steps of the method of FIG. 14 occurring in any suitable order. Moreover, although this disclosure describes and illustrates an example method for generating search queries with previews of search results including the particular steps of the method of FIG. 14, this disclosure contemplates any suitable method for generating search queries with previews of search results including any suitable steps, which may include all, some, or none of the steps of the method of FIG. 14, where appropriate. Furthermore, although this disclosure describes and illustrates particular components, devices, or systems carrying out particular steps of the method of FIG. 14, this disclosure contemplates any suitable combination of any suitable components, devices, or systems carrying out any suitable steps of the method of FIG. 14.

Social Graph Affinity and Coefficient

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Advertising

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more pages, in one or more e-mails, or in connection with search results requested by a user). In addition or as an alternative, an advertisement may be one or more sponsored stories (e.g. a newsfeed or ticker item on social-networking system 160), or may be one or more sponsored queries (e.g., a suggested query referencing a particular object). A sponsored story or query may include a reference to a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes by, for example, having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted.

In particular embodiments, an advertisement may be requested for display within social-networking-system pages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, the social-networking system 160 may execute or modify a particular action of the user. As an example and not by way of limitation, advertisements may be included among the search results of a search-results page, where sponsored content is promoted over non-sponsored content. As another example and not by way of limitation, advertisements may be included among suggested search queries, where suggested queries that reference the advertiser or its content/products may be promoted over non-sponsored queries.

An advertisement may include social-networking-system functionality that a user may interact with. For example, an advertisement may enable a user to "like" or otherwise endorse the advertisement by selecting an icon or link associated with endorsement. As another example, an advertisement may enable a user to search (e.g., by executing a query) for content related to the advertiser. Similarly, a user may share the advertisement with another user (e.g. through social-networking system 160) or RSVP (e.g. through social-networking system 160) to an event associated with the advertisement. In addition or as an alternative, an advertisement may include social-networking-system context directed to the user. For example, an advertisement may display information about a friend of the user within social-networking system 160 who has taken an action associated with the subject matter of the advertisement.

Systems and Methods

Figure 15:
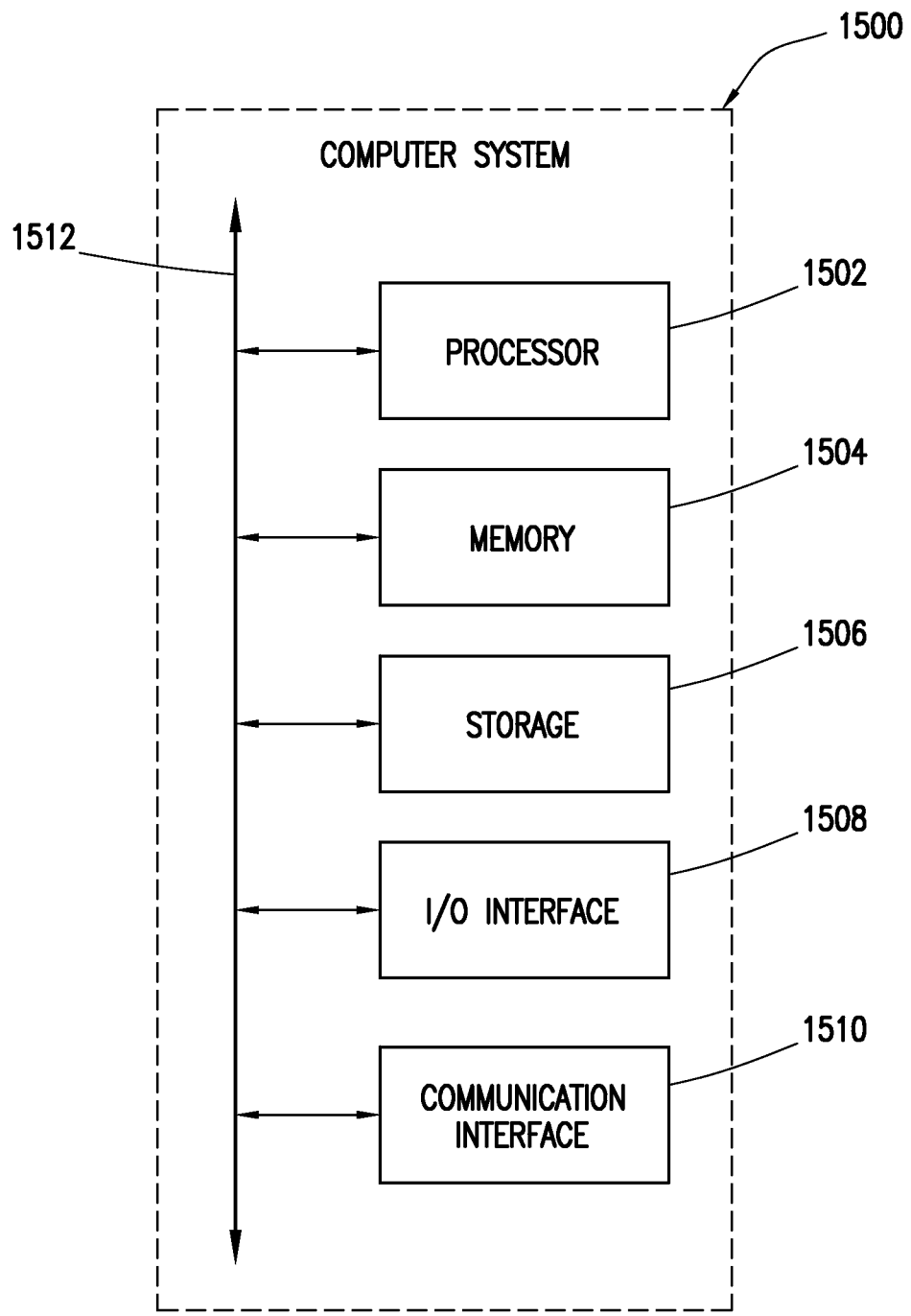
FIG. 15 illustrates an example computer system.

FIG. 15 illustrates an example computer system 1500. In particular embodiments, one or more computer systems 1500 perform one or more steps of one or more methods described or illustrated herein. In particular embodiments, one or more computer systems 1500 provide functionality described or illustrated herein. In particular embodiments, software running on one or more computer systems 1500 performs one or more steps of one or more methods described or illustrated herein or provides functionality described or illustrated herein. Particular embodiments include one or more portions of one or more computer systems 1500. Herein, reference to a computer system may encompass a computing device, and vice versa, where appropriate. Moreover, reference to a computer system may encompass one or more computer systems, where appropriate.

This disclosure contemplates any suitable number of computer systems 1500. This disclosure contemplates computer system 1500 taking any suitable physical form. As example and not by way of limitation, computer system 1500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1500 may include one or more computer systems 1500; be unitary or distributed; span multiple locations; span multiple machines; span multiple data centers; or reside in a cloud, which may include one or more cloud components in one or more networks. Where appropriate, one or more computer systems 1500 may perform without substantial spatial or temporal limitation one or more steps of one or more methods described or illustrated herein. As an example and not by way of limitation, one or more computer systems 1500 may perform in real time or in batch mode one or more steps of one or more methods described or illustrated herein. One or more computer systems 1500 may perform at different times or at different locations one or more steps of one or more methods described or illustrated herein, where appropriate.

In particular embodiments, computer system 1500 includes a processor 1502, memory 1504, storage 1506, an input/output (I/O) interface 1508, a communication interface 1510, and a bus 1512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1502 includes hardware for executing instructions, such as those making up a computer program. As an example and not by way of limitation, to execute instructions, processor 1502 may retrieve (or fetch) the instructions from an internal register, an internal cache, memory 1504, or storage 1506; decode and execute them; and then write one or more results to an internal register, an internal cache, memory 1504, or storage 1506. In particular embodiments, processor 1502 may include one or more internal caches for data, instructions, or addresses. This disclosure contemplates processor 1502 including any suitable number of any suitable internal caches, where appropriate. As an example and not by way of limitation, processor 1502 may include one or more instruction caches, one or more data caches, and one or more translation lookaside buffers (TLBs). Instructions in the instruction caches may be copies of instructions in memory 1504 or storage 1506, and the instruction caches may speed up retrieval of those instructions by processor 1502. Data in the data caches may be copies of data in memory 1504 or storage 1506 for instructions executing at processor 1502 to operate on; the results of previous instructions executed at processor 1502 for access by subsequent instructions executing at processor 1502 or for writing to memory 1504 or storage 1506; or other suitable data. The data caches may speed up read or write operations by processor 1502. The TLBs may speed up virtual-address translation for processor 1502. In particular embodiments, processor 1502 may include one or more internal registers for data, instructions, or addresses. This disclosure contemplates processor 1502 including any suitable number of any suitable internal registers, where appropriate. Where appropriate, processor 1502 may include one or more arithmetic logic units (ALUs); be a multi-core processor; or include one or more processors 1502. Although this disclosure describes and illustrates a particular processor, this disclosure contemplates any suitable processor.

In particular embodiments, memory 1504 includes main memory for storing instructions for processor 1502 to execute or data for processor 1502 to operate on. As an example and not by way of limitation, computer system 1500 may load instructions from storage 1506 or another source (such as, for example, another computer system 1500) to memory 1504. Processor 1502 may then load the instructions from memory 1504 to an internal register or internal cache. To execute the instructions, processor 1502 may retrieve the instructions from the internal register or internal cache and decode them. During or after execution of the instructions, processor 1502 may write one or more results (which may be intermediate or final results) to the internal register or internal cache. Processor 1502 may then write one or more of those results to memory 1504. In particular embodiments, processor 1502 executes only instructions in one or more internal registers or internal caches or in memory 1504 (as opposed to storage 1506 or elsewhere) and operates only on data in one or more internal registers or internal caches or in memory 1504 (as opposed to storage 1506 or elsewhere). One or more memory buses (which may each include an address bus and a data bus) may couple processor 1502 to memory 1504. Bus 1512 may include one or more memory buses, as described below. In particular embodiments, one or more memory management units (MMUs) reside between processor 1502 and memory 1504 and facilitate accesses to memory 1504 requested by processor 1502. In particular embodiments, memory 1504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1504 may include one or more memories 1504, where appropriate. Although this disclosure describes and illustrates particular memory, this disclosure contemplates any suitable memory.

In particular embodiments, storage 1506 includes mass storage for data or instructions. As an example and not by way of limitation, storage 1506 may include a hard disk drive (HDD), a floppy disk drive, flash memory, an optical disc, a magneto-optical disc, magnetic tape, or a Universal Serial Bus (USB) drive or a combination of two or more of these. Storage 1506 may include removable or non-removable (or fixed) media, where appropriate. Storage 1506 may be internal or external to computer system 1500, where appropriate. In particular embodiments, storage 1506 is non-volatile, solid-state memory. In particular embodiments, storage 1506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1506 taking any suitable physical form. Storage 1506 may include one or more storage control units facilitating communication between processor 1502 and storage 1506, where appropriate. Where appropriate, storage 1506 may include one or more storages 1506. Although this disclosure describes and illustrates particular storage, this disclosure contemplates any suitable storage.

In particular embodiments, I/O interface 1508 includes hardware, software, or both, providing one or more interfaces for communication between computer system 1500 and one or more I/O devices. Computer system 1500 may include one or more of these I/O devices, where appropriate. One or more of these I/O devices may enable communication between a person and computer system 1500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1508 for them. Where appropriate, I/O interface 1508 may include one or more device or software drivers enabling processor 1502 to drive one or more of these I/O devices. I/O interface 1508 may include one or more I/O interfaces 1508, where appropriate. Although this disclosure describes and illustrates a particular I/O interface, this disclosure contemplates any suitable I/O interface.

In particular embodiments, communication interface 1510 includes hardware, software, or both providing one or more interfaces for communication (such as, for example, packet-based communication) between computer system 1500 and one or more other computer systems 1500 or one or more networks. As an example and not by way of limitation, communication interface 1510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1510 for it. As an example and not by way of limitation, computer system 1500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1500 may include any suitable communication interface 1510 for any of these networks, where appropriate. Communication interface 1510 may include one or more communication interfaces 1510, where appropriate. Although this disclosure describes and illustrates a particular communication interface, this disclosure contemplates any suitable communication interface.

In particular embodiments, bus 1512 includes hardware, software, or both coupling components of computer system 1500 to each other. As an example and not by way of limitation, bus 1512 may include an Accelerated Graphics Port (AGP) or other graphics bus, an Enhanced Industry Standard Architecture (EISA) bus, a front-side bus (FSB), a HYPER-TRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1512 may include one or more buses 1512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by a computing device:
    accessing a social graph comprising a plurality of nodes and a plurality of edges connecting the nodes, each of the edges between two of the nodes representing a single degree of separation between them, the nodes comprising:
        a first node corresponding to a first user associated with an online social network; and
        a plurality of second nodes that each correspond to a concept or a second user associated with the online social network;
    generating a plurality of structured queries that each comprise references to one or more nodes of the plurality of nodes and one or more edges of the plurality of edges;
    calculating a score for each structured query based on one or more user-engagement factors; and
    sending each structured query having a score greater than a threshold score to the first user for display on a page currently accessed by the first user.

2. The method of claim 1, wherein calculating the score for each structured query based on the one or more user-engagement factors comprises calculating the score based at least in part on business-intelligence data.

3. The method of claim 1, wherein calculating the score for each structured query based on the one or more user-engagement factors comprises calculating the score based at least in part on a click-thru rate for the structured query.

4. The method of claim 1, wherein calculating the score for each structured query based on the one or more user-engagement factors comprises calculating the score based at least in part on a conversion-rate for the structured query.

5. The method of claim 1, wherein calculating the score for each structured query based on the one or more user-engagement factors comprises calculating the score based at least in part on a user-preference of the first user.

6. The method of claim 1, wherein calculating the score for each structured query based on the one or more user-engagement factors comprises calculating the score based at least in part on a search history of the first user.

7. The method of claim 1, wherein calculating the score for each structured query based on the one or more user-engagement factors comprises calculating the score based at least in part on whether the structured query is a sponsored query.

8. The method of claim 1, wherein calculating the score for each structured query based on the one or more user-engagement factors comprises calculating the score based at least in part on a social-graph affinity of the first node with respect to one or more of the nodes referenced in the structured query.

9. The method of claim 1, wherein calculating the score for each structured query based on the one or more user-engagement factors comprises calculating the score based at least in part on an intent of the first user.

10. The method of claim 1, wherein the score for each structured query is a probability that the first user will engage with the structured query.

11. The method of claim 1, wherein the page is a newsfeed page of the online social network, and wherein the sent structured queries are displayed as one or more stories in a newsfeed.

12. The methods of claim 1, wherein the page is a profile page of the online social network corresponding to a concept or a user.

13. The method of claim 1, wherein the page is a search-results page corresponding to a first structured query.

14. The method of claim 1, wherein the sent structured queries are displayed in association with a query field of the page.

15. The method of claim 1, wherein one or more of the sent structured queries are suggested search queries.

16. The method of claim 1, wherein one or more of the sent structured queries are recommendation queries.

17. The method of claim 16, further comprising:
    receiving from the first user a selection of one of the recommendation queries; and
    generating one or more search results corresponding to the selected recommendation query, wherein each search result comprises a reference to a second node that not connected to the first user node and is connected to one or more other second nodes corresponding to first-degree connections of the first user.

18. The method of claim 1, further comprising:
receiving from the first user a selection of one of the structured queries; and
generating one or more search results corresponding to the selected structured query.

19. One or more computer-readable non-transitory storage media embodying software that is operable when executed to:
access a social graph comprising a plurality of nodes and a plurality of edges connecting the nodes, each of the edges between two of the nodes representing a single degree of separation between them, the nodes comprising:
  a first node corresponding to a first user associated with an online social network; and
  a plurality of second nodes that each correspond to a concept or a second user associated with the online social network;
generate a plurality of structured queries that each comprise references to one or more nodes of the plurality of nodes and one or more edges of the plurality of edges;
calculate a score for each structured query based on one or more user-engagement factors; and
send each structured query having a score greater than a threshold score to the first user for display on a page currently accessed by the first user.

20. A system comprising: one or more processors; and a memory coupled to the processors comprising instructions executable by the processors, the processors operable when executing the instructions to:
access a social graph comprising a plurality of nodes and a plurality of edges connecting the nodes, each of the edges between two of the nodes representing a single degree of separation between them, the nodes comprising:
  a first node corresponding to a first user associated with an online social network; and
  a plurality of second nodes that each correspond to a concept or a second user associated with the online social network;
generate a plurality of structured queries that each comprise references to one or more nodes of the plurality of nodes and one or more edges of the plurality of edges;
calculate a score for each structured query based on one or more user-engagement factors; and
send each structured query having a score greater than a threshold score to the first user for display on a page currently accessed by the first user.

* * * * *